US012715991B2

(12) United States Patent
Treece et al.

(10) Patent No.: US 12,715,991 B2
(45) Date of Patent: Aug. 25, 2026

(54) RECYCLABLE EXTRUSION BLOW MOLDED ARTICLES FROM BLENDS OF COPOLYESTERS AND RECYCLED PET

(71) Applicant: Eastman Chemical Company, Kingsport, TN (US)

(72) Inventors: Mark Allan Treece, Jonesborough, TN (US); Michael Gage Armstrong, Johnson City, TN (US); Robert William Seymour, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 572 days.

(21) Appl. No.: 17/595,108

(22) PCT Filed: May 8, 2020

(86) PCT No.: PCT/US2020/032024
§ 371 (c)(1),
(2) Date: Nov. 9, 2021

(87) PCT Pub. No.: WO2020/231781
PCT Pub. Date: Nov. 19, 2020

(65) Prior Publication Data

US 2022/0227993 A1 Jul. 21, 2022

Related U.S. Application Data

(60) Provisional application No. 62/961,420, filed on Jan. 15, 2020, provisional application No. 62/846,194, filed on May 10, 2019.

(51) Int. Cl.

| | |
|---|---|
| ***C08L 67/03*** | (2006.01) |
| ***B29C 49/00*** | (2006.01) |
| ***B29C 49/04*** | (2006.01) |
| *B29K 67/00* | (2006.01) |

(52) U.S. Cl.
CPC .......... *C08L 67/03* (2013.01); *B29C 49/0005* (2013.01); *B29C 49/04* (2013.01); *B29K 2067/003* (2013.01)

(58) Field of Classification Search
CPC ..... C08L 67/02; C08J 2367/02; C08G 63/183
See application file for complete search history.

(56) References Cited

U.S. PATENT DOCUMENTS

| | | | |
|---|---|---|---|
| 2,720,507 | A | 10/1955 | Caldwell |
| 3,772,405 | A | 11/1973 | Hamb |
| 5,372,864 | A | 12/1994 | Weaver et al. |
| 5,384,377 | A | 1/1995 | Weaver et al. |
| 5,654,347 | A | 8/1997 | Khemani et al. |
| 5,696,176 | A | 12/1997 | Khemani et al. |
| 6,025,405 | A | 2/2000 | Snell Tung et al. |
| 8,080,191 | B2 | 12/2011 | Sequeira et al. |
| 9,062,197 | B2 | 6/2015 | Treece et al. |
| 9,074,092 | B2 | 7/2015 | Neill et al. |
| 9,234,986 | B2 | 1/2016 | Minezaki et al. |
| 9,267,000 | B2 | 2/2016 | Kim et al. |
| 9,279,033 | B2 | 3/2016 | Kim et al. |
| 9,453,119 | B2 | 9/2016 | Lu |
| 9,777,111 | B2 | 10/2017 | Colhoun et al. |
| 9,884,938 | B2 | 2/2018 | Bae et al. |
| 9,994,708 | B2 | 6/2018 | Mamino et al. |
| 10,093,796 | B2 | 10/2018 | Enomoto et al. |
| 10,179,849 | B2 | 1/2019 | Akahira et al. |
| 10,287,434 | B2 | 5/2019 | Sohn et al. |
| 10,800,897 | B2 | 10/2020 | Shin et al. |
| 2012/0157636 | A1* | 6/2012 | Neill ...................... B32B 27/36 525/444 |
| 2012/0328849 | A1 | 12/2012 | Neill et al. |
| 2013/0029068 | A1 | 1/2013 | Treece et al. |
| 2018/0126714 | A1 | 5/2018 | Motoshiromizu et al. |
| 2018/0194117 | A1 | 7/2018 | Garriga et al. |
| 2018/0311944 | A1 | 11/2018 | Leblanc |
| 2019/0077136 | A1 | 3/2019 | Ishimaru et al. |
| 2020/0079900 | A1 | 3/2020 | Hernandez et al. |
| 2020/0207934 | A1 | 7/2020 | Inoue et al. |
| 2020/0247103 | A1 | 8/2020 | Leblanc |
| 2020/0247989 | A1 | 8/2020 | Huang et al. |
| 2020/0308396 | A1 | 10/2020 | Barger et al. |

FOREIGN PATENT DOCUMENTS

| | | |
|---|---|---|
| EP | 3395855 A1 | 10/2018 |
| JP | 2006-274239 † | 10/2006 |
| JP | 2006 274239 A | 10/2006 |

(Continued)

OTHER PUBLICATIONS

Non-Final Office Communication dated Jun. 25, 2024 received in U.S. Appl. No. 17/595,107.
Third Party Observation received in EP Application No. 20 72 8861.4 date of submission Oct. 18, 2022.
Third Party Observation received in EP Application No. 20 72 8626.1 date of submission Oct. 18, 2022.
Final Office Communication notification date Jan. 10, 2025 received in U.S. Appl. No. 17/595,107.
Non-Final Office Communication dated Apr. 24, 2025 received in U.S. Appl. No. 17/595,107.
Final Office Communication dated Jul. 28, 2025 received in U.S. Appl. No. 17/595,107.

(Continued)

*Primary Examiner* — Gregory Listvoyb
(74) *Attorney, Agent, or Firm* — Tammye L. Taylor Polk

(57) ABSTRACT

The present disclosure relates to recyclable extrusion blow molded articles made from blends of recycled PET and copolyester compositions which comprise residues of terephthalic acid, neopentyl glycol (NPG), 1,4-cyclohexanedimethanol (CHDM), ethylene glycol (EG), and/or 2,2,4,4-tetramethyl-1,3-cyclobutanediol residues, in certain compositional ranges that are <4 mm thickness, have a high level of recycled PET content, have low haze and are recyclable in a PET stream.

8 Claims, 1 Drawing Sheet

(56) References Cited

FOREIGN PATENT DOCUMENTS

| | | | |
|---|---|---|---|
| WO | WO 92 13083 A1 | | 8/1992 |
| WO | WO 2009 091517 A1 | | 7/2009 |
| WO | 2009/129469 A1 | † | 10/2009 |
| WO | 2013/016118 A1 | † | 1/2013 |

OTHER PUBLICATIONS

Himawan, C. et al.; "Thermodynamic and kinetic aspects of fat crystallization"; Advances in Colloid and Interface Science, 122; pp. 3-33; 2006.

Co-pending U.S. Appl. No. 17/595,107, filed Nov. 9, 2021; Mark Allan Treece and Robert William Seymour.

Third-Party Submission under 37 CFR 1.290 with Concise Description of Relevance received in U.S. Appl. No. 17/595,107 date of submission Sep. 12, 2022.

Third-Party Submission under 37 CFR 1.290 with Concise Description of Relevance received in U.S. Appl. No. 17/595,108 date of submission Sep. 27, 2022.

Notification of Transmittal of the International Search Report and the Written Opinion of the International Searching Authority, or the Declaration received in International Application No. PCT/US2020/032019 date of mailing Jul. 24, 2020.

Notification of Transmittal of the International Search Report and the Written Opinion of the International Searching Authority, or the Declaration received in International Application No. PCT/US2020/032024 date of mailing Jul. 24, 2020.

Third Party Observation received in International Application No. PCT/US2020/032019 date of submission Sep. 9, 2021.

Third Party Observation received in International Application No. PCT/US2020/032024 date of submission Sep. 9, 2021.

National Association for PET Container Resources (NAPCOR) report on Postconsumer PET Container Recycling Activity; 2017.

California Assembly Bill No. 906 signed into law on Oct. 15, 2017; "Beverage Containers: polyethylene terephthalate"; Section 18013.

Non-Final Office Communication dated Mar. 19, 2026 received in U.S. Appl. No. 17/595,107.

Third Party Observation received in EP Application No. 20 72 8626.1 date of notification Mar. 27, 2026.

* cited by examiner
† cited by third party

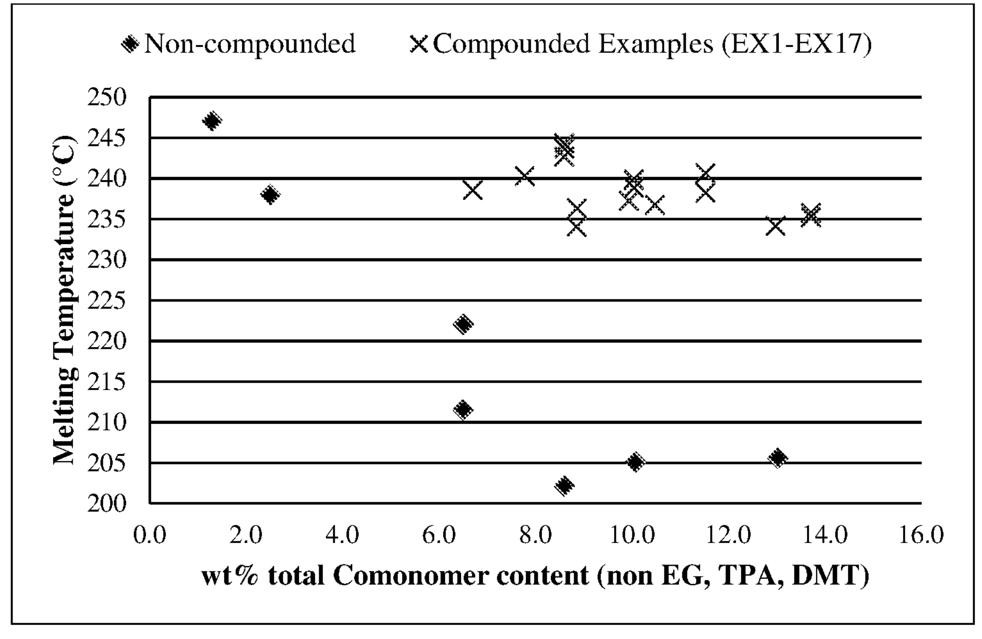
Non-compounded
Compounded Examples (EX1-EX17)
Melting Temperature (°C)
250
245
240
235
230
225
220
215
210
205
200
0.0
2.0
4.0
6.0
8.0
10.0
12.0
14.0
16.0
wt% total Comonomer content (non EG, TPA, DMT)

RECYCLABLE EXTRUSION BLOW MOLDED ARTICLES FROM BLENDS OF COPOLYESTERS AND RECYCLED PET

CROSS-REFERENCE TO RELATED APPLICATION(S)

This application is a national stage filing under 35 USC § 371 of International Application Number PCT/US2020/032024, filed on May 8, 2020 which claims the benefit of the filing date to U.S. Provisional Application No. 62/846,194, filed on May 10, 2019, and U.S. Provisional Application No. 62/961,420, filed on Jan. 15, 2020, the entire disclosures of which are incorporated by reference herein.

FIELD OF THE INVENTION

The present disclosure relates to recyclable molded articles and extrusion blow molded articles made from blends of recycled PET and copolyester compositions which comprise residues of terephthalic acid, neopentyl glycol (NPG), 1,4-cyclohexanedimethanol (CHDM), ethylene glycol (EG), and/or 2,2,4,4-tetramethyl-1,3-cyclobutanediel residues, in certain compositional ranges having certain advantages and improved properties.

BACKGROUND OF THE INVENTION

There is a commercial need for recyclable molded articles produced from copolyester thermoplastic materials that are transparent, as well as clear, tough, and chemically resistant.

To be considered recyclable, the articles must be transformable at the end of life back into usable polymeric material. Currently, poly(ethylene terephthalate) (PET) is the largest volume thermoplastic with an existing and well-established mechanical recycling stream.

Recycling of post-consumer PET is a complex process that involves separating opaque, colored and transparent components from each other as well as from containers made from different materials (e.g. polyethylene, polypropylene, PVC, etc.). Proper separation is critical as each of these materials can contaminate the PET stream and reduce the quality of the final sorted product. After separation, the clear PET bottles are ground into flake, cleaned, and dried at temperatures between 140° C. and 180° C. The flake may be used directly (for example in strapping and fiber extrusion) or further processed into pellets for film, sheet or bottle applications. For some applications the pellets may be further crystallized and solid-state polymerized at temperatures between 200° C. and 220° C. prior to use. Because of the well-established nature of this process it is desirable for copolyester-based molded articles and containers to be compatible with the existing PET recycle stream.

It is also desirable that the recycled PET (rPET) be incorporated back into new molded or extruded articles. Use of rPET lowers the environmental footprint of a product offering and improves the overall life-cycle analysis. Lastly, it is desirable for rPET to find uses in more durable, consumer-oriented product applications with a longer lifespan. For example, one such industry is the cosmetics and personal care industry, where the packaging itself is often an important part of the product's appeal. Other industries include but are not limited to consumer durables, appliances and parts, furniture components, electronic devices or peripherals, and durable packaging. In these industries, the use of rPET offers economic advantages, and it would reduce the overall amount of packaging-related products sent to landfills or that could potentially end up contaminating oceans or other bodies of water. Thus, incorporating more rPET into longer lasting durable product markets and applications where the currently-used resins lack a similar recyclability or recycled-content option offers a compelling solution. Historically, however, rPET has limitations which preclude its use in many of these types of applications.

The present disclosure addresses this long felt commercial need for durable molded articles produced from copolyester thermoplastic materials that are transparent, as well as clear, tough, and chemically resistant, that contain a significant level of rPET, and are also recyclable in a PET stream.

BRIEF SUMMARY OF THE INVENTION

One embodiment of the present disclosure is a recyclable, thick-walled article comprising a rPET/copolyester blend which comprises:

(1) 15-50 wt % of recycled polyethylene terephthalate (rPET) and (2) 50-85 wt % of at least one copolyester which comprises:

(a) a dicarboxylic acid component comprising:

i) 70 to 100 mole % of terephthalic acid residues;

ii) 0 to 30 mole % of aromatic and/or aliphatic dicarboxylic acid residues having up to 20 carbon atoms; and (b) a glycol component comprising:

i) 0 to 35 mole % of 2,2,4,4-tetramethyl-1,3-cyclobutanediol residues;

ii) 0 to 50 mole % of 1,4-cyclohexanedimethanol residues, iii) 0 to 50 mole % of neopentyl glycol residues;

iv) 0 to 35 mole % of other modifying glycols residues;

v) up to 98 mole % of ethylene glycol residues;

wherein the total mole % of the dicarboxylic acid component is 100 mole %, and the total mole % of the glycol component is 100 mole %; and wherein the blend has 5-15 wt % total comonomer content from glycols and acids other than ethylene glycol (EG), terephthalic acid (TPA), or dimethyl terephthalate (DMT);

wherein the inherent viscosity of the copolyester is 0.50 to 0.9 dL/g as determined in 60/40 (wt/wt) phenol/tetrachloroethane at a concentration of 0.5 g/100 ml at 25° C.;

wherein the copolyester has a Tg of 70 to 115° C.;

wherein the article has a melting temperature (Tm) of 225-255° C. or 235-250° C.;

wherein the article has a haze value of 20% or less; and wherein the article has a thickness of from 4-25 mm;

wherein the article has a crystallization half time of about 3 minutes to about 20 minutes at 180° C. or of about 3 to about 12 minutes or of about 5 to about 15 minutes;

wherein the article is recyclable in a PET recycle stream.

One embodiment of the present disclosure is a recyclable, thick-walled article comprising a rPET/copolyester blend which comprises:

(1) 15-50 wt % of recycled polyethylene terephthalate (rPET) and (2) 50-85 wt % of a copolyester which comprises:

(a) a dicarboxylic acid component comprising:

i) 70 to 100 mole % of terephthalic acid residues;

ii) 0 to 30 mole % of aromatic and/or aliphatic dicarboxylic acid residues having up to 20 carbon atoms; and (b) a glycol component comprising:

i) 0 to 35 mole % of 2,2,4,4-tetramethyl-1,3-cyclobutanediol residues;

ii) 0 to 50 mole % of 1,4-cyclohexanedimethanol residues, iii) 0 to 50 mole % of neopentyl glycol residues;

iv) 0 to 35 mole % of other modifying glycols residues;

v) up to 98 mole % of ethylene glycol residues;

wherein the total mole % of the dicarboxylic acid component is 100 mole %, and the total mole % of the glycol component is 100 mole %; and wherein the blend has 5-15 wt % total comonomer content from glycols and acids other than ethylene glycol (EG), terephthalic acid (TPA), or dimethyl terephthalate (DMT);

wherein the inherent viscosity of the copolyester is 0.50 to 0.9 dL/g as determined in 60/40 (wt/wt) phenol/tetrachloroethane at a concentration of 0.5 g/100 ml at 25° C.;

wherein the copolyester has a Tg of 70 to 115° C.;

wherein the article has a melting temperature (Tm) of 225-255° C. or 235-250° C.;

wherein the article has a haze value of 20% or less; and wherein the article has a thickness of from 4-25 mm;

wherein the article has a crystallization half time of about 3 minutes to about 20 minutes at 180° C. or of about 3 to about 12 minutes or of about 5 to about 15 minutes;

wherein the article is recyclable in a PET recycle stream.

In one embodiment, the recyclable, thick-walled article of has an enthalpy of melting (Hm) greater than 0.20 cal/g.

In one embodiment, the polyester has an inherent viscosity of 0.58 to 0.70 dig as determined in 60/40 (wt/wt) phenol/tetrachloroethane at a concentration of 0.5 g/100 ml at 25° C.

One aspect of the present disclosure is a method of making a recyclable, thick-walled molded article comprising:

(A) compounding a rPET/copolyester blend which comprises:

(1) 15-50 wt % of recycled polyethylene terephthalate (rPET); and (2) 50-85 wt % of at least one copolyester which comprises:

(a) a dicarboxylic acid component comprising: i) 70 to 100 mole % of terephthalic acid residues, dimethyl terephthalic acid, and/or isophthalic acid; and ii) 0 to 30 mole % of aromatic and/or aliphatic dicarboxylic acid residues having up to 20 carbon atoms; and (b) a glycol component comprising:

i) 0 to 35 mole % of 2,2,4,4-tetramethyl-1,3-cyclobutanediol residues;

ii) 0 to 50 mole % of 1,4-cyclohexanedimethanol residues;

iii) 0 to 50 mole % of neopentyl glycol residues;

iv) 0 to 35 mole % of other modifying glycols residues; and v) up to 98 mole % of ethylene glycol residues;

wherein the total mole % of the dicarboxylic acid component is 100 mole %, and the total mole % of the glycol component is 100 mole %; and wherein the blend has 5-15 wt % total comonomer content from glycols and acids other than ethylene glycol (EG), terephthalic acid (TPA), or dimethyl terephthalate (DMT);

(B) pelletizing the compounded blend;

(C) drying the compounded blend at a temperature of 60-160° C.;

(D) melting and injecting the compounded blend into a mold; and (E) ejecting the resulting shaped article from the mold.

In one aspect, the articles of the present disclosure are recyclable in a PET recycle stream.

In one embodiment, the blend compositions of the of the present disclosure are useful as articles of manufacture chosen from at least one of the following: molded articles, bottles, films, sheet, containers, medical containers, personal care containers or cosmetic containers.

In one embodiment, the articles of the present disclosure are useful as films, containers, packaging articles, appliance parts, cosmetic jars, bottles, medical containers, personal care containers, cosmetics containers, molded articles, lids, fragrance caps, tools, tool handles, toothbrushes, toothbrush handles, electronic and/or acoustic device housings, medical devices, medical packaging, healthcare supplies, commercial foodservice products, trays, containers, food pans, tumblers, storage boxes, bottles, food processors, blender and mixer bowls, utensils, water bottles, crisper trays, washing machine parts, refrigerator parts, vacuum cleaner parts, ophthalmic lenses and frames or toys.

One embodiment of the present disclosure is a recyclable, extrusion blow-molded article comprising a rPET/copolyester blend which comprises:

(1) 20-80 wt % of recycled polyethylene terephthalate (rPET) and (2) 20-80 wt % of at least one copolyester which comprises:

(a) a dicarboxylic acid component comprising:

i) 70 to 100 mole % of terephthalic acid residues;

ii) 0 to 30 mole % of aromatic and/or aliphatic dicarboxylic acid residues having up to 20 carbon atoms; and iii) 0 to 5 mole % of a branching monomer; and (b) a glycol component comprising:

i) 0 to 35 mole % of 2,2,4,4-tetra ethyl-1,3-cyclobutanediol residues;

ii) 0 to 50 mole % of 1,4-cyclohexanedimethanol residues, iii) 0 to 50 mole % of neopentyl glycol residues;

iv) 0 to 35 mole % of other modifying glycols residues;

v) up to 98 mole % of ethylene glycol residues; and vi) 0 to 5 mole % of a branching monomer; and wherein the total mole % of the dicarboxylic acid component is 100 mole %, and the total mole % of the glycol component is 100 mole %; and (3) 0.05 to 5 weight % of a chain extending agent, based on the total weight of the rPET/copolyester blend; and wherein the blend has 1-15 wt % total comonomer content from glycols and acids other than ethylene glycol (EG), terephthalic acid (TPA), or dimethyl terephthalate (DMT);

wherein the inherent viscosity of the copolyester is 0.50 to 1.2 dL/g as determined in 60/40 (wt/wt) phenol/tetrachloroethane at a concentration of 0.5 g/100 ml at 25° C.;

wherein the copolyester has a Tg of 70 to 115° C.;

wherein the article has a melting temperature (Tm) of 225-255° C. or 235-250° C. or 230-240° C.;

wherein the article has a haze value of 20% or less; and wherein the article has a thickness of from 0.2-4 mm;

wherein the article has a crystallization half time of about 1 minute to about 20 minutes at 180° C., or of about 1 to about 15 minutes at 180° C., or of about 3 to about 15 minutes at 180° C., or of about 3 to about 12 minutes at 180° C., or of about 5 to about 15 minutes at 180° C.;
wherein the article is recyclable in a PET recycle stream.

One embodiment of the present disclosure is a recyclable, extrusion blow-molded article comprising a rPET/copolyester blend which comprises:

(1) 20-80 wt % of recycled polyethylene terephthalate (rPET) and
(2) 20-80 wt % of a copolyester which comprises:
(a) a dicarboxylic acid component comprising:
i) 70 to 100 mole % of terephthalic acid residues;
ii) 0 to 30 mole % of aromatic and/or aliphatic dicarboxylic acid residues having up to 20 carbon atoms; and
iii) 0 to 5 mole % of a branching monomer; and
(b) a glycol component comprising:
i) 0 to 35 mole % of 2,2,4,4-tetramethyl-1,3-cyclobutanediol residues;
ii) 0 to 50 mole % of 1,4-cyclohexanedimethanol residues,
iii) 0 to 50 mole % of neopentyl glycol residues;
iv) 0 to 35 mole % of other modifying glycols residues;
v) up to 98 mole % of ethylene glycol residues; and
vi) 0 to 5 mole % of a branching monomer; and
wherein the total mole % of the dicarboxylic acid component is 100 mole %, and the total mole % of the glycol component is 100 mole %; and
(3) 0.05 to 5 weight % of a chain extending agent, based on the total weight of the rPET/copolyester blend; and
wherein the blend has 1-15 wt % total comonomer content from glycols and acids other than ethylene glycol (EG), terephthalic acid (TPA), or dimethyl terephthalate (DMT);
wherein the inherent viscosity of the copolyester is 0.50 to 1.2 dL/g as determined in 60/40 (wt/wt) phenol/tetrachloroethane at a concentration of 0.5 g/100 ml at 25° C.;
wherein the copolyester has a Tg of 70 to 115° C.;
wherein the article has a melting temperature (Tm) of 225-255° C. or 235-250° C. or 230-240° C.;
wherein the article has a haze value of 20% or less; and
wherein the article has a thickness of from 0.2-4 mm;
wherein the article has a crystallization half time of about 1 minutes to about 20 minutes at 180° C., or of about 1 to about 15 minutes at 180° C., or of about 3 to about 12 minutes at 180° C., or of about 3 to about 15 minutes at 180° C., or of about 5 to about 15 minutes at 180° C.;
wherein the article is recyclable in a PET recycle stream.

In one embodiment, the recyclable, extrusion blow-molded article of has an enthalpy of melting (Hm) greater than 0.20 cal/g.

In one embodiment, the copolyester has an inherent viscosity of 0.60 to 1.0 dL/g as determined in 60/40 (wt/wt) phenol/tetrachloroethane at a concentration of 0.5 g/100 ml at 25° C.

One aspect of the present disclosure is a method of making a recyclable, extrusion blow-molded article comprising:

(A) compounding a rPET/copolyester blend which comprises:
(1) 20-80 wt % of recycled polyethylene terephthalate (rPET); and
(2) 28-80 wt % of at least one copolyester which comprises:
(a) a dicarboxylic acid component comprising: i) 70 to 100 mole % of terephthalic acid residues, dimethyl terephthalic acid, and/or isophthalic acid; and ii) 0 to 30 mole % of aromatic and/or aliphatic dicarboxylic acid residues having up to 20 carbon atoms; and iii) 0 to 5 mole % of a branching monomer; and
(b) a glycol component comprising:
i) 0 to 35 mole % of 2,2,4,4-tetramethyl-1,3-cyclobutanediol residues;
ii) 0 to 50 mole % of 1,4-cyclohexanedimethanol residues;
iii) 0 to 50 mole % of neopentyl glycol residues;
iv) 0 to 35 mole % of other modifying glycols residues; and
v) up to 98 mole % of ethylene glycol residues; and
vi) 0 to 5 mole % of a branching monomer; and
wherein the total mole % of the dicarboxylic acid component is 100 mole %, and the total mole % of the glycol component is 100 mole %; and
(3) 0.05 to 5 weight % of a chain extender, based on the total weight of the rPET/copolyester blend; and
wherein the blend has 1-15 wt % total comonomer content from glycols and acids other than ethylene glycol (EG), terephthalic acid (TPA), or dimethyl terephthalate (DMT);
(B) pelletizing the compounded blend;
(C) drying the compounded blend at a temperature of 60-160° C., and optionally crystallizing the compounded blend at 120-180° C. before drying;
(D) melting the compounded blend in an extruder and extruding the molten composition through a die to form a tube or parison of molten polymer; and
(E) clamping a mold having the desired finished shape around the parison;
(F) blowing air into the parison, causing it to stretch and expand to fill the mold;
(G) cooling the molded article and ejecting the resulting article from the mold; and
(H) removing excess plastic from the article.

In one aspect, the extrusion blow-molded articles of the present disclosure are recyclable in a PET recycle stream.

In one embodiment, the blend compositions of the of the present disclosure are useful as articles of manufacture chosen from at least one of the following: molded articles, bottles, containers, medical containers, personal care containers or cosmetic containers.

In one embodiment, the articles of the present disclosure are useful as containers, packaging articles, cosmetic jars, bottles, medical containers, personal care containers, cosmetics containers, molded articles, medical devices, medical packaging, healthcare supplies, commercial foodservice containers, bottles, water bottles, or toys.

BRIEF DESCRIPTION OF THE DRAWINGS

FIG. 1 shows the melting temperature data from 1$^{st}$ heat DSC scan, versus weight percent (wt %) comonomer content (from monomers other than EG, TPA and DMT) which are in the molded articles.

DETAILED DESCRIPTION

The present disclosure may be understood more readily by reference to the following detailed description of certain embodiments of the disclosure and the working examples. In accordance with the purpose(s) of this disclosure, certain embodiments of the disclosure are described in the Summary of the Invention and are further described herein below. Also, other embodiments of the disclosure are described herein.

The present disclosure pertains to certain rPET/copolyester blends which can produce molded articles having the following attributes, all of which are becoming increasingly critical to market needs: (1) the compositions contain a high level of post-consumer recycled (PCR) material, in the form of rPET; (2) the articles are thick-walled (about 4-25 mm) and transparent (low haze); and (3) the compositions have a melting temperature (Tm) of 225-255° C., so they qualify as PET for recycling purposes and can be recycled at end of life with current, well established PET recycle streams.

In one aspect the molded articles of the present disclosure pertain to copolyester-based, environmentally friendly and sustainable articles for durable and consumer-oriented product applications that have two critical attributes. First, the articles of the present disclosure enable the ability to mold tough, transparent articles at thicknesses not currently attainable by homopolymer PET or rPET (about >4 mm). Second, the articles of the present disclosure are compatible in PET recycle streams, i.e. they can be processed under the conditions used for homopolymer PET recycling.

Regarding the first aspect, it is the crystallization rate of homopolymer PET (either virgin or recycled) that significantly limits its utility for producing clear, thick-walled articles. The rPET often crystallizes during processing and an opaque, white article results. Generally, it is difficult to produce clear articles and parts from rPET at wall thicknesses of about 4 mm or greater.

Generally, it is possible to reduce the rate of crystallization by incorporation of additional monomers into PET polyesters to produce modified copolyesters. An alternative to rPET or PET for such applications is a slower-crystallizing PET copolyester. For example, copolymers in which the glycol component is a mixture of ethylene glycol and a second glycol such as 1,4-cyclohexane dimethanol (CHUM) are useful.

Typically, clear thick-walled jars and other molded articles can be produced from these copolymers. Despite producing clear parts, however, the slow crystallization rates and lack of a discernible melting point at 225-250° C. for these copolyesters prevents these articles from being recycled in the PET recycle stream. Typically, copolyesters can meet one of the first of the two attributes discussed above but often fail in the second.

For example, ground flake from copolyesters may stick to the walls of a dryer or agglomerate with PET container flake in a dryer set at 140-180° C. Mixing ground flake from copolyester articles into rPET flake can also result in hazy films, sheet or bottles. These problems can occur at levels as low as 0.1% copolyester. The present disclosure, however, provides a desirable composition that is clear, that can be injection molded into thick (>4 mm) transparent articles, but are non-problematic in the PET recycle stream.

In one aspect, the present disclosure pertains to certain rPET/copolyester blends which can produce extrusion blow molded articles having the following attributes, all of which are becoming increasingly critical to market needs: (1) the compositions contain a high level of post-consumer recycled (PCR) material, in the form of rPET; (2) the articles have a thickness of about 0.2-4 mm and are transparent (low haze); and (3) the compositions have a melting temperature (Tm) of 225-255° C., so they qualify as PET for recycling purposes and can be recycled at end of life with current, well established PET recycle streams.

In one aspect the molded articles of the present disclosure pertain to copolyester-based, environmentally friendly and sustainable articles for durable and consumer-oriented product applications that have two critical attributes. First, the articles of the present disclosure enable the ability to mold tough, transparent articles at thicknesses<about 4 mm. Second, the articles of the present disclosure are compatible in PET recycle streams, i.e. they can be processed under the conditions used for homopolymer PET recycling.

Regarding the first aspect, it is the crystallization rate of homopolymer PET (either virgin or recycled) that significantly limits its utility for producing clear articles. The rPET often crystallizes during processing and an opaque, white article results. Generally, it is difficult to produce clear articles and parts from rPET. Additionally, because of its generally lower IV (<0.80) and high melting temperature (>235 C), rPET often fails to have sufficient melt strength on its own to satisfactorily process in extrusion blow molding.

Also, in general, it is possible to reduce the rate of crystallization by incorporation of additional monomers into PET polyesters to produce modified copolyesters. An alternative to rPET or PET for such applications is a slower-crystallizing PET copolyester. For example, copolymers in which the glycol component is a mixture of ethylene glycol and a second glycol such as 1,4-cyclohexane dimethanol (CHDM) are useful.

Further, in some embodiments, the crystallizability of PET or rPET contributes to it having low melt strength at processing temperatures, which makes it difficult to extrusion blow mold into articles. The melt strength can be increased by incorporation of branching monomers into the aforementioned copolymers.

Typically, clear, molded articles can be produced from these copolymers. Despite producing clear parts, however, the slow crystallization rates and lack of a discernible melting point at 225-250° C. for these copolyesters prevents these articles from being recycled in the PET recycle stream. Typically, copolyesters can meet one of the first of the two attributes discussed above but often fail in the second. In general, it can be difficult for copolyesters to perform satisfactorily in EBM processing, because they are challenging to produce at high enough viscosities (IV) without the incorporation of branching agents or chain extending technologies.

For example, ground flake from copolyesters may stick to the walls of a dryer or agglomerate with PET container flake in a dryer set at 140-180° C. Mixing ground flake from copolyester articles into rPET flake can also result in hazy films, sheet or bottles. These problems can occur at levels as low as 0.1% copolyester. The present disclosure, however, provides a desirable composition that is clear, that can be extrusion blow molded into transparent articles (<4 mm), but is compatible in the PET recycle stream.

In 2017, California Assembly Bill No. 906-Beverage containers: polyethylene terephthalate was signed into law, and it defines "polyethylene terephthalate" (PET) for purposes of resin code labeling as a plastic that meets certain conditions, including limits with respect to the chemical composition of the polymer and a melting peak temperature within a specified range. AB-906 adds Section 18013 to California's Public Resources Code, which reads, in part: "Polyethylene terephthalate (PET)" means a plastic derived from a reaction between terephthalic acid or dimethyl terephthalate and monoethylene glycol as to which both of the following conditions are satisfied:

a. The terephthalic acid or dimethyl terephthalate and monoethylene glycol reacted constitutes at least 90 percent of the mass of the monomer reacted to form the polymer.

b. The plastic exhibits a melting peak temperature that is between 225 degrees Celsius and 255 degrees Celsius, as determined during the second thermal scan using procedure 10.1 as set forth in ASTM International (ASTM) D3418 with a heating rate of a sample at 10 degrees Celsius per minute."

As such, copolyesters, and blends of the aforementioned which meet both of the conditions outlined in AB-906, are acceptable for being called "PET", and thus such materials are likely to be compatible in current PET recycle streams. The melting points of the blend compositions in the present disclosure make them acceptable under this definition as PET, and thus, compatible in the current PET recycle streams.

Thus, in one aspect of the present disclosure, "compatible with PET recycle streams" is defined as exhibiting a melting temperature of 225-255° C. on the first heat DSC scan (at 10-20 C/min scan rate) of a molded part, while also containing 15 wt % or less of glycols and/or acids other than EG, TPA, or DMT (referred to herein as the total wt % of comonomer content).

In the present disclosure, it has been found that blends of certain combinations of recycled PET and copolyesters can produce thick-walled molded articles with (1) a high level of recycled PET content; (2) low haze (transparent); and (3) compatibility in a PET recycle stream.

In the present disclosure, it has been found that blends of certain combinations of recycled PET and copolyesters can produce extrusion blow molded articles with (1) a high level of recycled PET content; (2) low haze (transparent); and (3) compatibility in a PET recycle stream.

These molded articles in the present disclosure are also recyclable, and they can be processed with PET recycle streams and end up as a component in the recyclable PET flake leaving the recycling process. The optimized rPET/copolyester blend compositions of this disclosure have a unique crystallization profile based on the melting point of copolyesters which enables the molded articles to be recycled. As such, they exhibit good properties as molded articles, but they have high melting points, so they provide superior performance in recycling processes. The molded articles of the present disclosure have melting temperatures and weight percent comonomer content loading consistent with the definitions in the Assembly Bill, thus it is expected that the molded articles of the present disclosure can be processed in standard PET recycle processes, and they do not have to be removed during the recycle process because they will not impact the process.

In one aspect of the present disclosure, the presence of a melting temperature peak is critical for functional adoption as a PET material acceptable for recycling. The articles of the present disclosure surprisingly exhibit a melting temperature of 225-255° C. despite having total comonomer content in the 5-15 wt % range.

In one aspect of the present disclosure, the presence of a melting temperature peak is critical for functional adoption as a PET material acceptable for recycling. The articles of the present disclosure surprisingly exhibit a melting temperature of 225-255° C. despite having total comonomer content in the 1-15 wt % range.

One embodiment of the present disclosure is a recyclable, thick-walled article comprising a rPET/copolyester blend which comprises:

(1) 15-50 wt % of recycled polyethylene terephthalate (rPET) and (2) 50-85 wt % of at least one copolyester which comprises:

(a) a dicarboxylic acid component comprising:

i) 70 to 100 mole % of terephthalic acid residues;

ii) 0 to 30 mole % of aromatic and/or aliphatic dicarboxylic acid residues having up to 20 carbon atoms; and (b) a glycol component comprising:

i) 0 to 35 mole % of 2,2,4,4-tetramethyl-1,3-cyclobutanediol residues;

ii) 0 to 50 mole % of 1,4-cyclohexanedimethanol residues, iii) 0 to 15 mole % of neopentyl glycol residues;

iv) 0 to 35 mole % of other modifying glycols residues;

v) up to 98 mole % of ethylene glycol residues;

wherein the total mole % of the dicarboxylic acid component is 100 mole %, and the total mole % of the glycol component is 100 mole %; and wherein the blend has 5-15 wt % total comonomer content from glycols and acids other than ethylene glycol (EG), terephthalic acid (TPA), or dimethyl terephthalate (DMT);

wherein the inherent viscosity of the copolyester is 0.50 to 0.9 dL/g as determined in 60/40 (wt/wt) phenol/tetrachloroethane at a concentration of 0.5 g/100 ml at 25° C.;

wherein the copolyester has a Tg of 70 to 115° C.;

wherein the article has a melting temperature (Tm) of 225-255° C.;

wherein the article has a haze value of 20% or less; and wherein the article has a thickness of from 4-25 mm;

wherein the article has a crystallization half time of about 3 minutes to about 20 minutes at 180° C.;

wherein the article is recyclable in a PET recycle stream.

One embodiment of the present disclosure is a recyclable, extrusion blow molded article comprising a rPET/copolyester blend which comprises:

(1) 20-80 wt % of recycled polyethylene terephthalate (rPET) and (2) 20-80 wt % of at least one copolyester which comprises:

(a) a dicarboxylic acid component comprising:

i) 70 to 100 mole % of terephthalic acid residues;

ii) 0 to 30 mole % of aromatic and/or aliphatic dicarboxylic acid residues having up to 20 carbon atoms; and iii) 0 to 5 mole % of a branching monomer; and (b) a glycol component comprising:

i) 0 to 35 mole % of 2,2,4,4-tetramethyl-1,3-cyclobutanediol residues;

ii) 0 to 50 mole % of 1,4-cyclohexanedimethanol residues, iii) 0 to 50 mole % of neopentyl glycol residues;

iv) 0 to 35 mole % of other modifying glycols residues;

v) up to 98 mole % of ethylene glycol residues;

vi) 0 to 5 mole % of a branching monomer; and wherein the total mole % of the dicarboxylic acid component is 100 mole %, and the total mole % of the glycol component is 100 mole %; and (3) 0.05 to 5 weight % of a chain extending agent based on the total weight of the rPET/copolyester blend; and wherein the blend has 1-15 wt % total comonomer content from glycols and acids other than ethylene glycol (EG), terephthalic acid (TPA), or dimethyl terephthalate (DMT);

wherein the inherent viscosity of the copolyester is 0.50 to 1.2 dL/g as determined in 60/40 (wt/wt) phenol/tetrachloroethane at a concentration of 0.5 g/100 ml at 25° C.;

wherein the copolyester has a Tg of 70 to 115° C.;

wherein the article has a melting temperature (Tm) of 225-255° C.;

wherein the article has a haze value of 20% or less; and wherein the article has a thickness of from 0.2-4 mm;

wherein the article has a crystallization half time of about 1 minutes to about 20 minutes at 180° C.;

wherein the article is recyclable in a PET recycle stream.

In one embodiment, the articles have a melting temperature (Tm) of 230-250° C. In another embodiment, the articles have a melting temperature (Tm) of 235-245° C. In another embodiment, the articles have a melting temperature (Tm) of 230-240° C.

There is no limitation on the recycled polyethylene terephthalate (rPET) that may be used in the blend compositions of the present disclosure. In one embodiment the rPET is mechanically recycled. In one embodiment the rPET is produced from chemically recycled monomers (produced by any known methods of depolymerization). In one embodiment, the rPET may have minor modifications such as with up to 5 mole % of isophthalic acid and/or up to 5 mole % of CHDM or other dials. In one embodiment, the recycled PET (rPET) can be virtually any "waste" industrial or post-consumer PET. In one embodiment, the rPET useful in the blend compositions of the present disclosure may be post-consumer recycled PET. In one embodiment, the rPET is post-industrial recycled PET. In one embodiment, the rPET is post-consumer PET from soft drink bottles. In one embodiment, scrap PET fibers, scrap PET films, and poor-quality PET polymers are also suitable sources of rPET. In one embodiment, the recycled PET comprises substantially PET, although other copolyesters can also be used, particularly where they have a similar structure as PET, such as PET copolymers or the like. In one embodiment, the rPET is clean. In one embodiment, the rPET is substantially free of contaminants. In one embodiment, the rPET may be in the form of flakes.

In one embodiment, up to about 50% by weight rPET can be incorporated into the blend compositions of the present disclosure. In one embodiment, the rPET/copolyester blend is 15-50 wt % of rPET. In one embodiment, the rPET/copolyester blend is 25-40 wt % of recycled polyethylene terephthalate (rPET). In one embodiment, the rPET/copolyester blend is 20-30 wt % of recycled polyethylene terephthalate (rPET). In one embodiment rPET/copolyester blend is 15-50 wt % of recycled polyethylene terephthalate (rPET) and 50-85 wt % of at least one copolyester.

In one embodiment, up to about 80% by weight rPET can be incorporated into the blend compositions of the present disclosure. In one embodiment, up to about 70% by weight rPET can be incorporated into the blend compositions of the present disclosure. In one embodiment, up to about 60% by weight rPET can be incorporated into the blend compositions of the present disclosure. In one embodiment, up to about 50% by weight rPET can be incorporated into the blend compositions of the present disclosure. In one embodiment, the rPET/copolyester blend is 20-80 wt % of rPET. In one embodiment, the rPET/copolyester blend is 25-75 wt % of recycled polyethylene terephthalate (rPET). In one embodiment, the rPET/copolyester blend is 20-50 wt % of recycled polyethylene terephthalate (rPET). In one embodiment, the rPET/copolyester blend is 20-30 wt % of recycled polyethylene terephthalate (rPET). In one embodiment rPET/copolyester blend is 20-80 wt % of recycled polyethylene terephthalate (rPET) and 20-80 wt % of at least one copolyester. In one embodiment rPET/copolyester blend is 20-50 wt % of recycled polyethylene terephthalate (rPET) and 50-80 wt % of at least one copolyester.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol, for example, glycols and dials. The term "glycol" as used herein includes, but is not limited to, dials, glycols, and/or multifunctional hydroxyl compounds, for example, branching agents. Alternatively, the difunctional carboxylic acid may be a hydroxy carboxylic acid, for example, p-hydroxybenzoic acid, and the difunctional hydroxyl compound may have an aromatic nucleus bearing 2 hydroxyl substituents, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a dial residue bonded through an ester group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a dial to make a polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a dial to make a polyester.

The polyesters used in the present disclosure typically can be prepared from dicarboxylic acids and dials which react in substantially equal proportions and are incorporated into the polyester polymer as their corresponding residues. The polyesters of the present disclosure, therefore, can contain substantially equal molar proportions of acid residues (100 mole %) and dial (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 1,4-cyclohexanedimethanol, based on the total dial residues, means the polyester contains 25 mole % 1,4-cyclohexanedimethanol residues out of a total of 100 mole % dial residues. Thus, there are 25 moles of 1,4-cyclohexanedimethanol residues among every 100 moles of dial residues.

In certain embodiments, terephthalic acid or an ester thereof, for example, dimethyl terephthalate or a mixture of terephthalic acid residues and an ester thereof can make up a portion or all of the dicarboxylic acid component used to form the polyesters useful in the present disclosure. In certain embodiments, terephthalic acid residues can make up a portion or all of the dicarboxylic acid component used to form the polyesters useful in this disclosure. For the purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present disclosure. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the present disclosure can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole % and from 0.01 to 1 mole %. In one embodiment, modifying aromatic dicarboxylic acids that may be used in the present disclosure include but are not limited to those having up to 20 carbon atoms, and which can be linear, para-oriented, or symmetrical. Examples of modifying aromatic dicarboxylic acids which may be used in this disclosure include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the present disclosure can be further modified with up to 30 mole %, up to 20 mole %, up to 10 mole %, up to 5 mole % or up to 1 mole % of one or more aliphatic dicarboxylic acids containing 2-20 carbon atoms, for example, cyclohexanedicarboxylic, malonic, succinic, glutaric, adipic, pimelic, suberic, azelaic and/or dodecanedioic dicarboxylic acids. Certain embodiments can also comprise 0.01 to 30 mole %. 0.01 to 20 mole %, 0.01 to 10 mole %, such as 0.1 to 30 mole %, 1 to 30 mole %, 5 to 30 mole %, or 0.1 to 20 mole %, 1 to 20 mole %, 5 to 20 mole %, or 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters and are useful in the present disclosure.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, the glycol component of the copolyesters in the blend compositions useful in the present disclosure can comprise 1,4-cyclohexanedimethanol. In another embodiment, the glycol component of the copolyesters in the blend compositions useful in the present disclosure comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In one embodiment, the glycol component of the copolyesters in the blend compositions useful in the present disclosure can comprise 2,2,4,4-tetramethyl-1,3-cyclobutanediol. In another embodiment, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

In one embodiment, the total comonomer content from glycols and acids other than ethylene glycol (EG), terephthalic acid (TPA), or dimethyl terephthalate (DMT) of the rPET/copolyester blend compositions useful in the present disclosure is from 1 to 15 wt %, or 1 to 10 wt %, 5 to 15 wt %, or from 5 to 10 wt %, or from 10 to 15 wt %, or from 2 to 15 wt %, or from 2 to 10 wt %, or from 3 to 15 wt %, or from 3 to 10 wt %, or from 4 to 15 wt %, or from 4 to 10 wt %, or from 6 to 15 wt %, or from 6 to 10 wt %, or from 7 to 15 wt %, or from 7 to 10 wt %, or from 8 to 15 wt %, or from 8 to 10 wt %, or from 9 to 15 wt %, or from 9 to 10 wt %, or from 11 to 15 wt %, 12 to 15 wt %, or from 13 to 15 wt %, 14 to 15 wt %, or from 12 to 16 wt %.

In one embodiment, the glycol component of the copolyesters in the rPET/copolyester blend compositions useful in this disclosure can contain 0 to 50 mole % of neopentyl glycol based on the total mole % of the glycol component being 100 mole %. In one embodiment, the glycol component of the copolyester in the rPET/copolyester blend compositions useful in this disclosure can contain 0 to 25 mole % of neopentyl glycol based on the total mole % of the glycol component being 100 mole %. In one embodiment, the glycol component of the copolyesters in the rPET/copolyester blend compositions useful in this disclosure can contain 0 to 50 mole % of neopentyl glycol based on the total mole % of the glycol component being 100 mole %. In one embodiment, the glycol component of the copolyesters in the rPET/copolyester blend compositions useful in this disclosure can contain 5 to 50 mole % of neopentyl glycol based on the total mole % of the glycol component being 100 mole %. In one embodiment, the glycol component of the copolyesters in rPET/copolyester blend compositions useful in this disclosure can contain 10 to 30 mole % of neopentyl glycol based on the total mole % of the glycol component being 100 mole %. In one embodiment, the glycol component of the copolyesters in the rPET/copolyester blend compositions useful in this disclosure can contain 10 to 15 mole % of neopentyl glycol based on the total mole % of the glycol component being 100 mole %. In one embodiment, the glycol component of the copolyesters in rPET/copolyester blend compositions useful in this disclosure can contain 15 to 45 mole % of neopentyl glycol based on the total mole % of the glycol component being 100 mole %.

In one embodiment, the glycol component of the copolyesters in the rPET/copolyester blend compositions useful in this disclosure can contain from 0 to 50 mole %, or from 0 to 40 mole %, or from 0 to 30 mole %, or from 0 to 20 mole %, or from 0 to 10 mole %, or from 0.01 to 50 mole %, or from 0.01 to 40 mole %, or from 0.01 to 30 mole %, or from 0.01 to 20 mole %, or from 0.01 to 15 mole %, or from 0.01 to 14 mole %, or from 0.01 to 13 mole %, or from 0.01 to 12 mole %, or from 0.01 to 11 mole %, or 0.01 to 10 mole %, or from 0.01 to 9 mole %, or from 0.01 to 8 mole %, or from 0.01 to 7 mole %, or from 0.01 to 6 mole %, or from 0.01 to 5 mole %, or from 0.1 to 50 mole %, or from 0.1 to 40 mole %, or from 0.1 to 30 mole %, or from 0.1 to 20 mole %, or from 0.1 to 10 mole %, or from 5 to 50 mole %, 10 to 50 mole %, or from 20 to 50 mole %, or from 30 to 50 mole %, or from 40 to 50 mole %, or from 20 to 40 mole %, or 30 to 40 mole %, or from 10 to 40 mole %, 10 to 30 mole %, or from 10 to 20 mole %, or from 20 to 30 mole %, or from 2 to 50 mole %, or from 2 to 40 mole %, or 2 to 30 mole %, or from 2 to 20 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, of neopentyl glycol residues, based on the total mole % of the glycol component being 100 mole %.

In one embodiment, the glycol component of the copolyesters in the rPET/copolyester blend compositions useful in this disclosure can contain from 0 to 50 mole % of 1,4-cyclohexanedimethanol based on the total mole % of the glycol component being 100 mole %. In one embodiment, the glycol component of the copolyester compositions useful in this disclosure can contain 0.01 to less than 50 mole % of 1,4-cyclohexanedimethanol based on the total mole % of the glycol component being 100 mole %. In one embodiment, the glycol component of the copolyester compositions useful in this disclosure can contain 0 to 15 mole % of 1,4-cyclohexanedimethanol based on the total mole % of the glycol component being 100 mole %. In one embodiment, the glycol component of the copolyester compositions useful in this disclosure can contain 0.01 to less than 15 mole % of 1,4-cyclohexanedimethanol based on the total mole % of the glycol component being 100 mole %. In one embodiment, the glycol component of the copolyester compositions useful in this disclosure can contain 0.01 to 5 mole % of 1,4-cyclohexanedimethanol based on the total mole % of the glycol component being 100 mole %. In one embodiment, the glycol component of the copolyester compositions useful in this disclosure can contain 0 to less than 5 mole % of 1,4-cyclohexanedimethanol based on the total mole % of the glycol component being 100 mole %.

In one embodiment, the glycol component of the copolyesters in the rPET/copolyester blend compositions useful in this disclosure can contain from 0 to 50 mole %, or from 0 to 40 mole %, or from 0 to 30 mole %, or from 0 to 20 mole %, or from 0 to 10 mole %, or from 0.01 to 50 mole %, or from 0.01 to 40 mole %, or from 0.01 to 30 mole %, or from 0.01 to 20 mole %, or from 0.01 to 15 mole %, or from 0.01 to 14 mole %, or from 0.01 to 13 mole %, or from 0.01 to 12 mole %, or from 0.01 to 11 mole %, or 0.01 to 10 mole %, or from 0.01 to 9 mole %, or from 0.01 to 8 mole %, or from 0.01 to 7 mole %, or from 0.01 to 6 mole %, or from 0.01 to 5 mole %, or from 0.1 to 50 mole %, or from 0.1 to 40 mole %, or from 0.1 to 30 mole %, or from 0.1 to 20 mole %, or from 0.1 to 10 mole %, or from 5 to 50 mole %, 10 to 50 mole %, or from 20 to 50 mole %, or from 30 to 50 mole %, or from 40 to 50 mole %, or from 20 to 40 mole %, or 30 to 40 mole %, or from 10 to 40 mole %, 10 to 30 mole %, or from 10 to 20 mole %, or from 20 to 30 mole %, or from 2 to 50 mole %, or from 2 to 40 mole %, or 2 to 30 mole %, or from 2 to 20 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, 1,4-cyclohexanedimethanol residues, based on the total mole % of the glycol component being 100 mole %.

In one embodiment, the glycol component of the copolyesters in the rPET/copolyester blend compositions useful in this disclosure can contain from 0 to 35 mole %, or from 0 to 30 mole %, or from 0 to 25 mole %, or from 0 to 20 mole %, or from 0 to 10 mole %, or from 0.01 to 35 mole %, or from 0.01 to 30 mole %, or from 0.01 to 25 mole %, or from 0.01 to 20 mole %, or from 0.01 to 15 mole %, or from 0.01 to 14 mole %, or from 0.01 to 13 mole %, or from 0.01 to 12 mole %, or from 0.01 to 11 mole %, or 0.01 to 10 mole %, or from 0.01 to 9 mole %, or from 0.01 to 8 mole %, or from 0.01 to 7 mole %, or from 0.01 to 6 mole %, or from 0.01 to 5 mole %, or from 0.1 to 35 mole %, or from 0.1 to 30 mole %, or from 0.1 to 25 mole %, or from 0.1 to 20 mole %, or from 0.1 to 10 mole %, or from 5 to 35 mole %, 10 to 35 mole %, or from 20 to 35 mole %, or from 25 to 35 mole %, 10 to 30 mole %, or from 10 to 20 mole %, or from 20 to 30 mole %, or from 2 to 35 mole %, or from 2 to 25 mole %, or 2 to 30 mole %, or from 2 to 20 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, of 2,2,4,4-tetramethyl-1,3-cyclobutanediol residues, based on the total mole % of the glycol component being 100 mole %.

In one embodiment, the glycol component of the copolyesters in the rPET/copolyester blend compositions useful in this disclosure can contain 0 to 35 mole % of 2,2,4,4-tetramethyl-1,3-cyclobutanediol based on the total mole % of the glycol component being 100 mole %. In one embodiment, the glycol component of the copolyester compositions useful in this disclosure can contain 0.01 to less than 35 mole % of 2,2,4,4-tetramethyl-1,3-cyclobutanediol based on the total mole % of the glycol component being 100 mole %. In one embodiment, the glycol component of the copolyester compositions useful in this disclosure can contain 0 to 30 mole % of 2,2,4,4-tetramethyl-1,3-cyclobutanediol based on the total mole % of the glycol component being 100 mole %. In one embodiment, the glycol component of the copolyester compositions useful in this disclosure can contain 0.01 to less than 30 mole % of 2,2,4,4-tetramethyl-1,3-cyclobutanediol based on the total mole % of the glycol component being 100 mole %. In one embodiment, the glycol component of the copolyester compositions useful in this disclosure can contain 0.01 to 25 mole % of 2,2,4,4-tetramethyl-1,3-cyclobutanediol based on the total mole % of the glycol component being 100 mole %. In one embodiment, the glycol component of the copolyester compositions useful in this disclosure can contain 0 to less than 25 mole % of 2,2,4,4-tetramethyl-1,3-cyclobutanedial based on the total mole % of the glycol component being 100 mole %.

It should be understood that some other glycol residues may be formed in situ during processing. For example, in one embodiment, the total amount of diethylene glycol residues can be present in the copolyesters useful in the present disclosure, whether or not formed in situ during processing or intentionally added, or both, in any amount, for example, from 1 to 15 mole %, or from 2 to 12 mole %, or from 2 to 11 mole %, or 2 to 10 mole %, or from 2 to 9 mole %, or from 3 to 12 mole %, or from 3 to 11 mole %, or 3 to 10 mole %, or from 3 to 9 mole %, or from 4 to 12 mole %, or from 4 to 11 mole %, or 4 to 10 mole %, or from 4 to 9 mole %, or, from 5 to 12 mole %, or from 5 to 11 mole %, or 5 to 10 mole %, or from 5 to 9 mole %, of diethylene glycol residues, based on the total mole % of the glycol component being 100 mole %.

In one embodiment, the total amount of diethylene glycol (DEG) residues present in the copolyesters useful in the present disclosure, whether or not formed in situ during processing or intentionally added or both, can be from 5 mole % or less, or 4 mole % or less, or from 3.5 mole % or less, or from 3.0 mole % or less, or from 2.5 mole % or less, or from 2.0 mole % or less, or from 1.5 mole % or less, or from 1.0 mole % or less, or from 1 to 4 mole %, or from 1 to 3 mole %, or from 1 to 2 mole % of diethylene glycol residues, or from 2 to 8 mole %, or from 2 to 7 mole %, or from 2 to 6 mole %, or from 2 to 5 mole %, or from 3 to 8 mole %, or from 3 to 7 mole %, or from 3 to 6 mole %, or from 3 to 5 mole %, or in some embodiments there is no intentionally added diethylene glycol residues, based on the total mole % of the glycol component being 100 mole %. In certain embodiments, the copolyester contains no added modifying glycols. In certain embodiments, the diethylene glycol residues in copolyesters can be from 5 mole % or less. It should be noted that any low levels of DEG formed in situ are not included in the total comonomer content from glycols and acids other than EG, TPA or DMT.

For all embodiments, the remainder of the glycol component can comprise ethylene glycol residues in any amount based on the total mole % of the glycol component being 100 mole %. In one embodiment, the copolyesters useful in the present disclosure can contain 50 mole or greater, or 55 mole % or greater, or 60 mole % or greater, or 65 mole % or greater, or 70 mole % or greater, or 75 mole % or greater, or 80 mole % or greater, or 85 mole % or greater, or 90 mole % or greater, or 95 mole % or greater, or 98 mole % or greater or from 50 to 90 mole %, or from 55 to 90 mole %, or from 50 to 80 mole %, or from 55 to 80 mole %, or from 60 to 80 mole %, or from 50 to 75 mole %, or from 55 to 75 mole %, or from 60 to 75 mole %, or from 65 to 75 mole % of ethylene glycol residues, based on the total mole % of the glycol component being 100 mole %.

In one embodiment, the glycol component of the copolyesters in the rPET/copolyester blend compositions useful in the present disclosure can contain up to 35 mole %, up to 30 mole %, up to 25 mole %, up to 20 mole %, or up to 19 mole %, or up to 18 mole %, or up to 17 mole %, or up to 16 mole %, or up to 15 mole %, or up to 14 mole %, or up to 13 mole %, or up to 12 mole %, or up to 11 mole %, or up to 10 mole %, or up to 9 mole %, or up to 8 mole %, or up to 7 mole %, or up to 6 mole %, or up to 5 mole %, or up to 4 mole %, or up to 3 mole %, or up to 2 mole %, or up to 1 mole %, or less of one or more other modifying glycols (other modifying glycols are defined as glycols which are not ethylene glycol, diethylene glycol, neopentyl glycol, 1,4-cyclohexanedimethanol, or 2,2,4,4-tetramethyl-1,3-cyclobutanediol). In certain embodiments, the copolyesters useful in this disclosure can contain 35 mole % or less of one or more other modifying glycols; 30 mole % or less of one or more other modifying glycols; 25 mole % or less of one or more other modifying glycols; 20 mole % or less of one or more other modifying glycols; 15 mole % or less of one or more other modifying glycols; 10 mole % or less of one or more other modifying glycols. In certain embodiments, the copolyesters useful in this disclosure can contain 5 mole % or less of one or more other modifying glycols. In certain embodiments, the copolyesters useful in this disclosure can contain 3 mole % or less of one or more other modifying glycols. In another embodiment, the copolyesters useful in this disclosure can contain 0 mole % of other modifying glycols. It is contemplated, however, that some other glycol residuals may form in situ so that residual amounts formed in situ are also an embodiment of this disclosure.

In embodiments, the other modifying glycols for use in the copolyesters, if used, as defined herein contain 2 to 16 carbon atoms. Examples of other modifying glycols include, but are not limited to, 1,2-propanediol, 1,3-propanediol, isosorbide, 1,4-butanediol, 1,5-pentanediol, 1,6-hexanediol, p-xylene glycol; polytetramethylene glycol, and mixtures thereof. In one embodiment, isosorbide is an other modifying glycol. In another embodiment, the other modifying glycols include, but are not limited to, at least one of 1,3-propanediol and 1,4-butanediol. In one embodiment, 1,3-propanediol and/or 1,4-butanediol can be excluded. If 1,4- or 1,3-butanediol are used, greater than 4 mole % or greater than 5 mole % can be provided in one embodiment. In one embodiment, at least one other modifying glycol is 1,4-butanediol which present in the amount of 5 to 35 mole %.

In some embodiments, the copolyester compositions according to the present disclosure can comprise from 0 to 10 mole %, for example, from 0 to 5 mole %, from 0.01 to 5 mole %, from 0.01 to 1 mole %, from 0.05 to 5 mole %, from 0.05 to 1 mole %, or from 0.1 to 0.7 mole %, or from 0.05 to 2.0 mole %, 0.05 to 1.5 mole %, 0.05 to 1.0 mole %, 0.05 to 0.8 mole %, 0.05 to 0.6 mole %, 0.1 to 2.0 mole %, 0.1 to 1.5 mole %, 0.1 to 1.0 mole %, 0.1 to 0.8 mole %, 0.1 to 0.6 mole %, 0.2 to 2.0 mole %, 0.2 to 1.5 mole %, 0.2 to 1.0 mole %, 0.2 to 0.8 mole %, 0.2 to 0.6 mole %, 0.3 to 2.0 mole %, 0.3 to 1.5 mole %, 0.3 to 1.0 mole %, 0.3 to 0.8 mole %; 0.3 to 0.6 mole %, 0.5 to 2.0 mole %, 0.5 to 1.5 mole %, 0.5 to 1.0 mole %, or 0.5 to 0.8 mole %, based the total mole percentages of either the glycol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the copolyester. In some embodiments, the copolyester(s) useful in the present disclosure can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like.

In one embodiment, the branching monomer residues can comprise 0.1 to 0.7 mole % of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the copolyester reaction mixture or blended with the copolyester in the form of a concentrate as described, for example, in U.S. Pat. Nos. 5,654,347 and 5,696,176, whose disclosure regarding branching monomers is incorporated herein by reference.

In one embodiment, branching monomer or branching agents useful in making the copolyesters formed within the context of the present disclosure can be ones that provide branching in the acid unit portion of the copolyester, or in the glycol unit portion, or it can be a hybrid. In some embodiments, some examples of branching agents are polyfunctional acids, polyfunctional anhydrides, polyfunctional glycols and acid/glycol hybrids. Examples include tri- or tetracarboxylic acids and their corresponding anhydrides, such as trimesic acid, pyromellitic acid, and lower alkyl esters thereof and the like, and tetrols such as pentaerythritol. Also, triols such as trimethylopropane or dihydroxy carboxylic acids and hydroxydicarboxylic acids and derivatives, such as dimethyl hydroxy terephthalate, and the like are useful within the context of this disclosure. In one embodiment, trimellitic anhydride is the branching monomer or branching agent.

The copolyesters compositions useful in the present disclosure can comprise at least one chain extender. Suitable chain extenders include, but are not limited to, multifunctional (including, but not limited to, bifunctional) isocyanates, multifunctional epoxides, including, for example, epoxylated novolacs, and phenoxy resins. In one embodiment, the chain extending agents have epoxide dependent groups. In one embodiment, the chain extending additive can be one or more styrene-acrylate copolymers with epoxide functionalities. In one embodiment, the chain extending additive can be one or more copolymers of glycidyl methacrylate with styrene.

In certain embodiments, chain extenders may be added at the end of the polymerization process or after the polymerization process. If added after the polymerization process, chain extenders can be incorporated by compounding or by addition during conversion processes such as injection molding or extrusion. In certain embodiments, the chain extending agents may be added to the rPET, to the copolyester, or to the blend during or after blending. In some embodiments, the chain extending agents can be incorporated by compounding or by addition during the conversion processes such as injection molding or extrusion.

The amount of chain extender used can vary depending on the specific monomer composition used and the physical properties desired but is generally about 0.05 percent by weight to about 10 percent by weight based on the total weight of the rPET/copolyester blend composition, such as about 0.1 to about 10% by weight or 0.1 to about 5% by weight, 0.1 to about 2% by weight, or 0.1 to about 1% by weight based on the total weight of the copolyester blend composition. In one embodiment the copolyester composition comprises 0.05 to 5 percent by weight, of a chain extending agent based on the total weight of the rPET/copolyester blend composition.

In some embodiments, the chain extending agent can also be added during melt processing to build molecular weight through 'reactive extrusion' or 'reactive chain coupling' or any other process known in the art.

In one embodiment, certain copolyester blend compositions useful in the present disclosure can exhibit a melt viscosity (MV) at a shear rate of 1 radian/sec of greater than 10,000 poise, or greater than 20,000 poise, or greater than 30,000 poise, or greater than 40,000 poise, or greater than 50,000 poise, or greater than 60,000 poise, or greater than 70,000 poise, or greater than 80,000 poise, or greater than 90,000 poise, or greater than 100,000 poise where the melt viscosity is measured at 260° C. and 1 radian/sec using a rotary viscometer such as a Rheometrics Dynamic Analyzer (RDA II). In one embodiment, certain copolyester blend compositions useful in the present disclosure can exhibit a melt viscosity (MV) at a shear rate of 1 radian/sec of 10,000 poise to 120,000 poise, or of 20,000 poise to 80,000 poise where the melt viscosity is measured at 260° C. and 1 radian/sec using a rotary viscometer such as a Rheometrics Dynamic Analyzer (RDA II).

It is contemplated that copolyester compositions useful in the present disclosure can possess at least one of the inherent viscosity ranges described herein and at least one of the monomer ranges for the copolyester compositions described herein, unless otherwise stated. It is also contemplated that copolyester compositions useful in the present disclosure can possess at least one of the Tg ranges described herein and at least one of the monomer ranges for the copolyester compositions described herein, unless otherwise stated. It is also contemplated that copolyester compositions useful in the present disclosure can possess at least one of the inherent viscosity ranges described herein, at least one of the Tg ranges described herein, and at least one of the monomer ranges for the copolyester compositions described herein, unless otherwise stated.

For embodiments of this disclosure, the copolyester compositions useful in this disclosure can exhibit at least one of the following inherent viscosities as determined in 60/40 (wt/wt) phenol/tetrachloroethane at a concentration of 0.25 g/50 ml at 25° C.: 0.50 to 1.2 dL/g; 0.50 to 1.0 dL/g; 0.50 to 0.90 dL/g; 0.50 to 0.80 dL/g; 0.55 to 1.2 dL/g; 0.55 to 1.0 dL/g; 0.55 to 0.90 dL/g; 0.55 to 0.80 dL/g; 0.58 to 1.2 dL/g; 0.58 to 1.0 dL/g; 0.58 to 0.90 dL/g; 0.58 to 0.80 dL/g; 0.60 to 0.90 dL/g; 0.60 to 0.80 dL/g; 0.65 to 0.90 dL/g; 0.60 to 0.80 dL/g; 0.70 to 0.80 dL/g; 0.50 to 0.75 dL/g; 0.55 to 0.75 dL/g; 0.58 to 0.75 dL/g; 0.60 to 0.75 dL/g; 0.60 to 0.70 dL/g; 0.58 to 0.70 dL/g; or 0.55 to 0.70 dL/g.

The glass transition temperature (Tg) of the copolyesters of the rPET/copolyester blend compositions is determined using a TA DSC 2920 from Thermal Analyst Instrument at a scan rate of 20° C./min. The value of the glass transition temperature is determined during the second heat.

In certain embodiments, the molded articles of this disclosure comprise rPET/copolyester blends compositions wherein the copolyester has a Tg of 70 to 115° C.; 70 to 80° C.; 70 to 85° C.; or 70 to 90° C.; or 70 to 95° C.; 70 to 100° C.; 70 to 105° C.; 70 to 110° C.; 80 to 115° C.; 80 to 85° C.; or 80 to 90° C.; or 80 to 95° C.; 80 to 100° C.; 80 to 105° C.; 80 to 110° C.; 90 to 115° C.; 90 to 100° C.; 90 to 105° C.; 90 to 110° C.

In one embodiment, the rPET/copolyester blend compositions useful in this disclosure are clear or visually clear. The term "visually clear" is defined herein as an appreciable absence of cloudiness, haziness, and/or muddiness, when inspected visually. In one embodiment, the rPET/copolyester blend compositions useful in this disclosure are transparent. The term "transparent" is defined herein as an appreciable absence of cloudiness, haziness, and/or muddiness, such that you can see through the material when inspected visually. These terms are used interchangeably herein. In one aspect the terms clear and/or transparent are defined as having low haze. In one embodiment, clear and/or transparent are defined as having a haze value of 20% or less. In one embodiment, clear and/or transparent are defined as having a haze value of 15% or less. In one embodiment, clear and/or transparent are defined as having a haze value of 12% or less. In one embodiment, clear and/or transparent are defined as having a haze value of 10% or less. In one embodiment, clear and/or transparent are defined as having a haze value of 5% or less.

Any amorphous or essentially amorphous copolyesters are suitable for use in the present disclosure. In one embodiment, the copolyesters of the present disclosure are amorphous. In one embodiment, the copolyesters of the present disclosure are amorphous or slow to crystallize. In one embodiment, the copolyesters of the present disclosure are essentially amorphous. In one embodiment, any copolyesters can be used in this disclosure provided that they are essentially amorphous and have a minimum crystallization half-time of at least about 10 minutes or greater. In one embodiment, the copolyesters of this disclosure have a crystallization half time of at least about 20 minutes or greater. The crystallization half time may be, for example, at least 30 minutes or greater, at least 50 minutes or greater, at least 60 minutes or greater. The amorphous copolyesters in the present disclosure can, in some embodiments, have crystallization half-times up to infinity.

The rPET/copolyester blends in the present disclosure are fast crystallizing, making them compatible with the PET recycle stream. For example, in one embodiment, the rPET/copolyester blends have a crystallization half-time of about 1 minute to about 20 minutes. For example, in another embodiment, the rPET/copolyester blends have a crystallization half-time of about 3 minutes to about 20 minutes. In one embodiment the rPET/copolyester blends have a crystallization half-time of up to about 20 minutes, or up to about 15 minutes or up to about 10 minutes or up to about 5 minutes. In one embodiment, the rPET/copolyester blend can be used provided that its crystallization half-time is about 3 minutes. In another embodiment, the rPET/copolyester blend can be used provided that its crystallization half-time is about 5 minutes. In another embodiment, the rPET/copolyester blend can be used provided that its crystallization half-time is about 10 minutes. In another embodiment, the rPET/copolyester blend can be used provided that its crystallization half-time is about 15 minutes. In another embodiment, the rPET/copolyester blend can be used provided that its crystallization half-time is about 20 minutes. In another embodiment, the rPET/copolyester blend can be used provided that its crystallization half-time is less than about 20 minutes. In another embodiment, the rPET/copolyester blend can be used provided that its crystallization half-time is less than about 15 minutes. In another embodiment, the rPET/copolyester blend can be used provided that its crystallization half-time is less than about 10 minutes. In another embodiment, the rPET/copolyester blend can be used provided that its crystallization half-time is less than about 5 minutes.

The crystallization half times of the copolyesters or the rPET/copolyester blends, as used herein, may be measured using conventional methods. For example, in one embodiment, the crystallization halftimes were measured using a differential scanning calorimeter (DSC). In these cases, the samples were ramped (20° C./min) to 285° C. and held isothermally for 2 mins. Next, the polymer was quickly dropped to a setpoint temperature (180° C.) and held until crystallization was completed, denoted by a full endothermic heat flow curve. Half-time was reported as the time from start of crystallization to the time that half of the peak was formed.

In one embodiment, the copolyesters can be produced by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a copolyester. See U.S. Pat. No. 3,772,405 for methods of producing copolyesters, the disclosure regarding such methods is hereby incorporated herein by reference. In one embodiment, the copolyesters can be produced from chemically recycled monomers (produced by any known methods of depolymerization).

The copolyesters in general may be prepared by condensing the dicarboxylic acid or dicarboxylic acid ester with the glycol in the presence of a catalyst at elevated temperatures increased gradually during the course of the condensation up to a temperature of about 225° C. to 310° C., in an inert atmosphere, and conducting the condensation at low pressure during the latter part of the condensation, as described in further detail in U.S. Pat. No. 2,720,507 incorporated herein by reference herein.

In some embodiments, during the process for making the copolyesters useful in the present disclosure, certain agents which colorize the polymer can be added to the melt including toners or dyes. In one embodiment, a bluing toner is added to the melt in order to reduce the b* of the resulting copolyester polymer melt phase product. Such bluing agents include blue inorganic and organic toner(s) and/or dyes. In addition, red toner(s) and/or dyes can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the copolyester's raw materials, e.g., ethylene glycol.

The total amount of toner components added can depend on the amount of inherent yellow color in the base copolyester and the efficacy of the toner. In one embodiment, a concentration of up to about 15 ppm of combined organic toner components and a minimum concentration of about 0.5 ppm can be used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

The rPET/copolyester blends compositions can be prepared by conventional processing techniques known in the art, such as melt blending, melt mixing, compounding via single screw extrusion, compounding via twin-screw extrusion, batch melt mixing equipment or combinations of the aforementioned. In one embodiment, the rPET/copolyester blends compositions are compounded at temperatures of 220-320° C. In one embodiment, the rPET/copolyester blends compositions are compounded at temperatures of 220-300° C. In one embodiment, the rPET/copolyester blend components can be pre-dried at 60-160° C. In one embodiment, the rPET/copolyester blend components are not pre-dried. In one embodiment, the compounding can occur under vacuum. In one embodiment, the compounding does not occur under vacuum.

In some embodiments, the the rPET/copolyester blend copolyester compositions can also contain common additives in the amounts required for the intended application. In some embodiments, the rPET/copolyester blend copolyester compositions can contain from 0.01 to 25% or 0.01 to 10% by weight of the overall composition common additives such as colorants, toner(s), dyes, mold release agents, flame retardants, extenders, reinforcing agents or materials, fillers, antistatic agents, antimicrobial agents, antifungal agents, self-cleaning or low surface energy agents, scents or fragrances, antioxidants, extrusion aids, slip agents, release agents, carbon black, and other pigments, plasticizers, glass bubbles, nucleating agents, stabilizers, including but not limited to, UV stabilizers, thermal stabilizers, and/or reaction products thereof, fillers, and impact modifiers, and the like, and mixtures thereof, which are known in the art for their utility in copolyester blends. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the copolyester composition.

In one embodiment, reinforcing materials may be added to the compositions useful in this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In one aspect of the present disclosure, the disclosed rPET/copolyester blend compositions are useful as thermoformed and/or thermoformable film(s) or sheet(s). The present disclosure is also directed to articles of manufacture which incorporate the thermoformed film(s) and/or sheet(s) of this disclosure. In one embodiment, the rPET/copolyester blend compositions of the present disclosure are useful as films and sheets which are easily formed into shaped or molded articles. In one embodiment, the film(s) and/or sheet(s) of the present disclosure may be processed into molded articles or parts by thermoforming. The rPET/copolyester blend compositions of the present disclosure may be used in a variety of molding and extrusion applications.

One aspect of the present disclosure is a method of making molded or shaped parts and articles using thermoforming. Any thermoforming techniques or processes known to those skilled in the art may be used to produce the molded or shaped articles of this disclosure.

In one embodiment, the film and sheet used in the molding or thermoforming process can be made by any conventional method known to those skilled in the art. In one embodiment, the sheet or film is formed by extrusion. In one embodiment, the sheet or film is formed by calendering.

In one embodiment, the heatset parts can be removed from the mold cavity by known means for removal. For example, in one embodiment, blowback is used and it involves breaking the vacuum established between the mold and the formed film or sheet by the introduction of compressed air. In some embodiments, the molded article or part is subsequently trimmed and the scrap ground and recycled.

In one embodiment, the compositions of the present disclosure are useful as plastics, films, fibers, and sheet. The compositions of this disclosure are useful as molded or shaped articles, molded or shaped parts or as solid plastic objects. In one embodiment, the compositions of this disclosure are useful as molded parts or molded articles. The compositions are suitable for use in any applications where clear, hard plastics are required. Examples of such parts and articles include cutlery, disposable cutlery, cutlery handles, disposable knives, forks, spoons, plates, cups, straws, jars, cosmetics packaging, lids, decorative lids, personal care product packaging, eyeglass frames, ophthalmic lenses, toothbrushes, toothbrush handles, toys, utensils, tools, tool handles, camera parts, parts of electronic devices, razor parts, ink pen barrels, disposable syringes, bottles, bottle caps, shelving, shelving dividers, electronics housing, electronic equipment cases, computer monitors, printers, keyboards, pipes, automotive parts, automotive interior parts, automotive trim, signs, outdoor signs, skylights, thermoformed letters, siding, toys, toy parts, thermally conductive plastics, medical devices, dental trays, dental appliances, containers, food containers, shipping containers, packaging, furniture components, multiwall film, multilayer film, insulated parts, insulated articles, insulated containers, trays, food trays, food pans, tumblers, storage boxes, food processors, blender and mixer bowls, water bottles, crisper trays, washing machine parts, refrigerator parts, vacuum cleaner parts, thermally conductive plastics, healthcare supplies, commercial foodservice products, boxes, films for graphic arts applications, plastic films for plastic glass laminates, point of purchase displays, smoke vents, laminated cards, fenestration, glazing, partitions, ceiling tiles, lighting, machine guards, graphic arts, lenticular, extrusion laminated sheets or films, decorative laminates, office furniture, face shields, medical packaging, sign holders on point of display shelving, and shelf price holds, and the like.

In one embodiment, the compositions of this disclosure are useful as extrusion blow molded or shaped articles, extrusion blow molded or shaped parts or as solid plastic objects. In one embodiment, the compositions of this disclosure are useful as extrusion blow molded parts or molded articles. The compositions are suitable for use in any applications where clear, rigid plastics are required. Examples of such parts and articles include containers, jars, cosmetics packaging, lids, decorative lids, personal care product packaging, ink pen barrels, disposable syringes, bottles, bottle caps, automotive interior parts, automotive trim, toys, toy parts, thermally conductive plastics, medical devices, dental appliances, food containers, shipping containers, packaging, furniture components, multiwall film, multilayer film, insulated parts, insulated articles, insulated containers, storage boxes, food processors, blender and mixer bowls, water bottles, crisper trays, washing machine parts, refrigerator parts, vacuum cleaner parts, thermally conductive plastics, healthcare supplies, commercial foodservice products, boxes, medical packaging, and the like.

In one aspect, this disclosure further relates to articles of manufacture comprising the film(s) and/or sheet(s) containing the rPET/copolyester blend compositions described herein. In some embodiments, the films and/or sheets of the present disclosure can be of any thickness as required for the intended application.

In one aspect, this disclosure further relates to the film(s) and/or sheet(s) described herein. The methods of forming the rPET/copolyester blend compositions into film(s) and/or sheet(s) includes any methods known in the art. Examples of film(s) and/or sheet(s) of the disclosure including but not limited to extruded film(s) and/or sheet(s), calendered film(s) and/or sheet(s), compression molded film(s) and/or sheet(s), Methods of making film and/or sheet include but are not limited to extrusion, calendering, and compression molding.

In one aspect, this disclosure further relates to the molded or shaped articles described herein. The methods of forming the rPET/copolyester blend compositions into molded or shaped articles includes any known methods in the art. Examples of molded or shaped articles of this disclosure including but not limited to thermoformed or thermoformable articles, injection molded articles, extrusion molded articles, injection blow molded articles, injection stretch blow molded articles and extrusion blow molded articles. Methods of making molded articles include but are not limited to thermoforming, injection molding, extrusion, injection blow molding, injection stretch blow molding, and extrusion blow molding. The processes of this disclosure can include any thermoforming processes known in the art. The processes of this disclosure can include any blow molding processes known in the art including, but not limited to, extrusion blow molding, extrusion stretch blow molding, injection blow molding, and injection stretch blow molding.

In one aspect, this disclosure includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

In one aspect, this disclosure includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

In one aspect, this disclosure includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

In one embodiment, the molded articles and parts of the present disclosure can be of any thickness required for the intended end use application. In one embodiment, the thickness of the molded articles and parts of the present disclosure are greater than about 4 mm. In one embodiment, the thickness of the molded articles and parts is from about 4-25 mm. In one embodiment, the thickness of the molded articles and parts is from about 7-25 mm. In one embodiment, the thickness of the molded articles and parts is from about 10-20 mm.

In one embodiment, the extrusion molded articles and parts of the present disclosure can be of any thickness required for the intended end use application. In one embodiment, the thickness of the extrusion blow molded articles and parts of the present disclosure are less than about 4 mm. In one embodiment, the thickness of the extrusion blow molded articles and parts of the present disclosure are less than about 3 mm. In one embodiment, the thickness of the extrusion blow molded articles and parts of the present disclosure are less than about 2 mm. In one embodiment, the thickness of the extrusion blow molded articles and parts of the present disclosure are less than about 1 mm. In one embodiment, the thickness of the extrusion blow molded articles and parts is from about 0.2 mm to 4 mm. In one embodiment, the thickness of the extrusion blow molded articles and parts is from about 0.5-3 mm. In one embodiment, the thickness of the extrusion blow molded articles and parts is from about 0.5-2 mm.

The following examples further illustrate how the rPET/copolyester blend compositions of the present disclosure can be made and evaluated, and they are intended to be purely exemplary and are not intended to limit the scope thereof. Unless indicated otherwise, parts are parts by weight, temperature is in degrees C. (Celsius) or is at room temperature, and pressure is at or near atmospheric.

EXAMPLES

This disclosure can be further illustrated by the following examples of preferred embodiments thereof, although it will be understood that these examples are included merely for purposes of illustration and are not intended to limit the scope of the disclosure unless otherwise specifically indicated.

Description of Materials & Test Methods

Materials Used for Compounding:

Table 1 is a summary of the various copolyester resins used for compounding the blend compositions. Sample C31 and Sample E31 are amorphous copolyester materials with 31 mol % (15.9 wt %) modification from 1,4-cyclohexanedimethanol (CHDM) but having different inherent viscosities (IhV). Sample E4 is a lower CHMD modified, semicrystalline copolyester material with 4.5 mol % CHDM. Sample E12 is a semicrystalline copolyester material with 12 mol % CHDM. Sample C50 has the highest CHDM loading, at 50 mol %. Sample G23 material is another amorphous copolyester material with 23 mol % (12.1 wt %) modification from 2,2,4,4-dimethyl 1,3-cyclobutanediol (TMCD). In all cases, the acid component is from dimethyl terephthalate (DMT) and the primary glycol is ethylene glycol (EG). These resin samples are available from Eastman Chemical Company.

Two sources of recycled PET, clean and clear bottle flake, were used to create the compounded blend compositions. rPET1 was supplied by Perpetual® Recycling Solutions (Richmond, Indiana) and rPET2 was supplied by Polyquest Incorporated (Wilmington, NC). In both cases, the compositions were measured by NMR to be approximately 2 mol % (or 1.3 wt %) isophthalic acid (IPA) content, the balance being from EG, and DMT or terephthalic acid (TPA). Also, in both cases the measured IhV was 0.75 (±0.02). It should be noted that the total weight percentage (wt %) comonomer content referenced in Table 1 and throughout this application reflects the total amount of comonomer from components other than EG, IPA, or DMT (or TPA) which are intentionally added to produce the polymer (it does not include byproducts formed in situ). In converting from the known and measured mol % to wt %, the molecular weight of each monomer was used as follows: EG=62. CHDM=144, TMCD=144, DMT=194, IPA=166, TPA=194 (in all cases g/mol).

TABLE 1

| | Glycols | | | Acids | | Inherent | | Total wt % |
|---|---|---|---|---|---|---|---|---|
| Samples | mol % CHDM | mol % TMCD | mol % EG | mol % IPA | mol % DMT/TPA | Viscosity (IhV, dl/g) | Tg (° C.) | Comonomer content |
| 1 Sample C31 | 31 | | 69 | | 100 | 0.65 | 80 | 15.9 |
| 2 Sample E31 | 31 | | 69 | | 100 | 0.72 | 80 | 15.9 |
| 3 Sample G23 | | 23 | 77 | | 100 | 0.64 | 93 | 12.1 |
| 4 Sample E4 | 4.5 | | 95.5 | | 100 | 0.75 | 80 | 2.5 |
| 5 Sample E12 | 12 | | 88 | | 100 | 0.67 | 80 | 6.5 |
| 6 Sample C50 | 50 | | | | 100 | 0.63 | 83 | 24.3 |
| 7 Sample rPET 1 | | | 100 | 2 | 98 | 0.75 | 80 | 1.3 |
| 8 Sample rPET 2 | | | 100 | 2 | 98 | 0.75 | 80 | 1.3 |

Twin-Screw Extrusion of Blend Compositions:

A co-rotating 26 mm twin screw extruder was used to compound the recycled PET with the various amorphous copolyester resins. The extruder model used was a Coperion ZSK 26 MC, 2016. This extruder has 11 different barrel zones. A general-purpose screw setup was employed. Production rates were generally around 40-60 pounds per hour, and all materials were fed at the feed throat entrance into the extruder. The extruder RPM was generally 250-350. The copolyester pellets and the rPET flake were metered separately into the feed throat using Brabender-type gravimetric feeders. Vacuum was pulled near the die exit to prevent degradation of the materials. Barrel temperatures were controlled at 270-280° C. Prior to compounding, the rPET was dried at 150° C. for 4-6 hours and the various copolyester resins were dried at 65° C. for 4-6 hours.

Injection Molding of Discs

Miniature discs were injection molded using 300 g of material that was dried in a convection oven for 2 hours at 170° C. The material was placed into a Miniature Plastic Molding Mini-Jector Model #55-1 molding machine with a temperature profile of 277° C. at the feed throat and 288° C. at the injection nozzle. Approximately 275 grams of material was flushed through the instrument prior to injecting into a 4 cm diameter, 0.317 cm thick mold.

Measurement of Haze

Haze and Total Transmittance were measured using a BYK-Gardner Haze-Gard Plus instrument and these values are reported as a percentage (%). ASTM 01003, Standard Test Method for Haze and Luminous Transmittance of Transparent Plastics, was utilized.

Measurement of Inherent Viscosity (IhV)

As used herein the term inherent viscosity (or IhV) is the viscosity of a 60/40 (wt/wt) phenol/tetrachloroethane solution of 0.25 g copolyester per 50 ml solution measured at a temperature of 25° C. or 30° C. This viscosity is a measure of the polymer's molecular weight and is reported as dL/g. When reported here these values can be taken to be (±0.02 dL/g).

Measurement of Polymer Thermal Properties

The melting point temperatures ($T_m$), glass transition temperatures ($T_g$), enthalpies of crystallization ($H_c$) and enthalpies of melting ($H_m$) and peak crystallization temperatures ($T_c$) of the molded discs were determined using a TA Q2000 DSC instrument from Thermal Analyst Instruments at a scan rate of 20° C./min according to ASTM D3418. The sample weight was approximately 6-7 milligrams in a standard aluminum 40 μL sample pan purchased from TA Instruments. Nitrogen gas was used to purge at 50 mL/min. The sample was heated from 23° C. to 285° C. (20° C./min) in a first heat step, before being cooled at 20° C./min to −5° C. For the second heat step, the sample was ramped again at 20° C.; min to 285° C. The reported melting point temperature ($T_m$) is the peak minimum of the endothermic heat flow curve of the second heat melting scan. The reported glass transition temperature ($T_g$) is determined from the midpoint of the enthalpy step change in the scan, prior to the melting temperature.

In some cases, where reported, molded discs were annealed before being submitted to DSC to pre-crystallize the samples to generate a measurable melting temperature. These samples were placed in an oven at 150° C. for 15-minute, 30-minute, one hour, and two-hour intervals in an aluminum pan. The samples were removed at each time interval to determine if crystallization had occurred (as evidenced by the sample turning opaque and white). Once the sample crystallized no further annealing was done.

Injection Molding of Thick-walled Plaques

To evaluate the ability to mold parts that are clear and thick, a wedge-type plaque with variable thickness was molded on a 200-ton TOYO injection molding machine with a 46 mm general purpose screw. The wedge plaques are plaques of variable thickness (4.5"×4.5") in which the thickness varies linearly from 0.40" to 0.10". The occurrence of crystallinity-induced haze in the plaques was approximately estimated as the thickness at which print was no longer legible through the plaque. Molding of the compositions was conducted at processing temperatures of 249-266° C. and mold temperatures 16-32° C. to produce four different molding conditions for the crystallization assessment. Screw speeds were determined as appropriate for each material, but generally ranged from 60-120 RPM. Cycle times were an output based upon the aforementioned process conditions, but generally ranged from 60-90 s, depending on the specific composition and conditions being tested.

Reactor-grade Polymerization Process

To compare the compounded compositions of the present disclosure with reactor grade formulations having the same general polymeric composition, flask-scale synthesis was conducted to produce four formulations.

Table 2 summarizes the initial charge and the final composition for the flask-scale synthesis. A 500 ml polymerization flask was attached to a nitrogen inlet, stainless-steel stirrer and glassware conducive to condensation-type polymerizations. The contents were vacuum purged under nitrogen two times to inert and then immersed in a molten metal bath at 200° C. until the metal level was slightly above the melt level in the flask. The nitrogen flow rate was then set at 0.4 SCFH to sweep over volatiles generated during the reaction. Slow stirring was initiated until the solids were fully melted. Once melted, the stir speed was increased to 150-200 rpm.

For CX1 and CX2:

The flask and contents were held at 200° C. for one hour, 215° C. for one hour and then fully submerged in the metal bath as the temperature was ramped to 265° C. over a 20-minute period. Once at 265° C., phosphorus catalyst was added to the flask through a septum port, the nitrogen flow was stopped, and the internal pressure was reduced from atmospheric to 130 torr over a 20-minute period. The temperature was then increased to 275° C. while the pressure was reduced to 15 torr over a period of 10 minutes and then to 3 torr over a period of 5 minutes, where it was held for 20 minutes. Afterwards, the pressure was reduced to 0.6 torr (for CX1) or 0.7 torr (for CX2) and held for 45 minutes at 275° C. and then an additional 60 minutes (for CX1) or 45 minutes (for CX2) at 278° C.

For CX3 and CX4:

The bath temperature was ramped from 200° C. to 275° C. over a 150-minute period. Phosphorus catalyst was added five minutes before the ramp period was concluded. Afterwards, the nitrogen flow was stopped, and the internal pressure was reduced from atmospheric to 0.5 torr in 20 minutes. The pressure was maintained at 0.5 torr and temperature at 275° C. for 180 minutes (for CX3) or 165 minutes (for CX4).

The stir speed was lowered in stages from 150-200 rpm to a final speed of 50 rpm as the polymer melt viscosity increased. The resulting polymer was clear with yellow color. The polymer melt was allowed to cool for 40 minutes and then extracted from the flask. Approximately five polymers of each composition were made in the above manner and cryogenically ground and mixed to pass through a 6 mm sieve, producing about 1 lb of material. The final composition and IhV values are listed in Table 2.

TABLE 2

| | Initial Charge | | | | | Produced Polymer | | |
|---|---|---|---|---|---|---|---|---|
| Sample | DMT (g) | EG (g) | CHDM (g) | TMCD (g) | Catalyst | mol % | IhV (dL/g) | Total wt % Comonomer content |
| CX1 | 116.5 | 64.3 | 16.5 | | Mn/Ti/P | 19% CHDM | 0.67 | 10.1 |
| CX2 | 116.5 | 62 | 22 | | Mn/Ti/P | 25% CHDM | 0.68 | 13 |
| CX3 | 116.5 | 50.5 | | 14 | Ti/P | 12% TMCD | 0.64 | 6.5 |
| CX4 | 116.5 | 48.5 | | 19.5 | Ti/P | 16% TMCD | 0.65 | 8.6 |

Description of Results

Examples of this disclosure are compounded blends, containing post-consumer recycled PET content. The blends are molded into thick parts without crystalline-induced haze (<20% haze on an ⅛" injection molded plaque), and the blend compositions are compatible with PET recycle streams, as defined herein. In this disclosure. "compatible with PET recycle streams" is defined as exhibiting a melting temperature of 225-255° C. on the first heat DSC scan of a molded part, while also containing 15 wt % or less of glycols and/or acids other than EG, TPA, or DMT (referred to herein as the total wt % of comonomer content).

Table 3 shows seventeen examples (EX1-EX17) of compounded formulations incorporating two different recycled PETs, at loadings ranging from 15-50 wt %, into various copolyester resins. The IhV and thermal properties reported are measured on the molded miniature discs. The thermal properties specifically reported are from the first heat DSC scan and are melting temperature ($T_m$), enthalpy of melting ($H_m$) and glass transition temperature ($T_g$). In all cases, these blends surprisingly exhibit a melting temperature of 235-250° C., as well as enthalpies of melting (Hm) which are greater than 0.20 cal/g. This implies that the samples have enough crystallinity and ability to crystallize quickly enough in the DSC scan that such formulations would be considered acceptable for compatibility in the PET recycle stream. In all cases, the IhVs produced range from 0.58-0.70. However, it should noted that lower and higher IhV's of these blends (within the range of 0.50-0.9 dL/g) would also be suitable in the present disclosure. The haze reported is <20% on a ⅛" (3.175 mm) thick molded part in all cases. It is noted that EX16 haze value is higher than all other samples. This is because EX16 was compounded under cold conditions (260-270° C.), whereas all other materials were compounded at 270-280° C. and produced haze values<12%. As such, in some applications, the rPET/copolyester blends should be compounded at temperatures of 270-280° C. or higher, to ensure the optimal visual aesthetics and very low haze. Table 3 also illustrates that different sources of rPET work well in the blends of the present disclosure.

CX5 in Table 3 is shown as a comparative example. This material was compounded with a higher CHDM polymer such that the final formulation contained 20.9% total wt % comonomer content. While this sample did exhibit a melting temperature, the haze was extremely high (40.2%), in large part due to the high comonomer content of the blend. As such, this sample illustrates that the total comonomer content from glycols and acids other than EG, DMT and TPA should be ≥15%.

TABLE 3

| Reference | Compounding Temperature (° C.) | Copolyester Content (%) | Samples | rPET Content (%) | rPET Source | Total wt % Comonomer content (non-EG, DMT/TPA) | IhV (dL/g) | Haze (%) | $T_m$ (° C.), 1st Heat | $H_m$ (cal/g), 1$^{st}$ Heat | $T_g$ (° C.), 1$^{st}$ Heat |
|---|---|---|---|---|---|---|---|---|---|---|---|
| EX1 | 270-280 | 85% | Sample C31 | 15% | rPET1 | 13.7 | 0.62 | 3.5 | 236 | 1.2 | 79 |
| EX2 | 270-280 | 85% | Sample G23 | 15% | rPET1 | 10.5 | 0.56 | 3.3 | 237 | 0.2 | 92 |
| EX3 | 270-280 | 85% | Sample C31 | 15% | rPET2 | 13.7 | 0.61 | 2.0 | 235 | 0.7 | 78 |
| EX4 | 270-280 | 80% | Sample C31 | 20% | rPET1 | 13.0 | 0.62 | 4.6 | 234 | 2.2 | NM |
| EX5 | 270-280 | 80% | Sample G23 | 20% | rPET1 | 9.9 | 0.58 | 4.8 | 237 | 0.7 | 90 |
| EX6 | 270-280 | 70% | Sample E31 | 30% | rPET1 | 11.5 | 0.69 | 7.5 | 238 | 3.9 | 79 |
| EX7 | 270-280 | 70% | Sample C31 | 30% | rPET1 | 11.5 | 0.64 | 6.7 | 241 | 4.3 | 77 |
| EX8 | 270-280 | 70% | Sample G23 | 30% | rPET1 | 8.9 | 0.62 | 7.2 | 234 | 3.1 | 87 |
| EX9 | 270-280 | 70% | Sample G23 | 30% | rPET2 | 8.9 | 0.64 | 3.6 | 236 | 1.7 | NM |
| EX10 | 270-280 | 60% | Sample E31 | 40% | rPET1 | 10.0 | 0.70 | 10.6 | 240 | 5.0 | 81 |
| EX11 | 270-280 | 60% | Sample C31 | 40% | rPET1 | 10.0 | 0.64 | 8.9 | 240 | 5.4 | 75 |
| EX12 | 270-280 | 60% | Sample G23 | 40% | rPET1 | 7.8 | 0.64 | 9.2 | 240 | 4.1 | 84 |
| EX13 | 270-280 | 60% | Sample C31 | 40% | rPET2 | 10.0 | 0.64 | 4.8 | 239 | 4.8 | NM |
| EX14 | 270-280 | 50% | Sample E31 | 50% | rPET1 | 8.6 | 0.70 | 8.8 | 243 | 6.0 | 81 |
| EX15 | 270-280 | 50% | Sample C31 | 50% | rPET1 | 8.6 | 0.65 | 11.7 | 244 | 6.2 | 78 |
| EX16 | 260-270 | 50% | Sample E31 | 50% | rPET1 | 8.6 | 0.69 | 18.8 | 244 | 6.4 | 74 |
| EX17 | 270-280 | 50% | Sample G23 | 50% | rPET2 | 6.7 | 0.65 | 5.8 | 239 | 5.0 | NM |
| CX5 | 270-280 | 85% | Sample C50 | 15% | rPET1 | 20.9 | 0.62 | 41.2 | 242 | 1.0 | 82 |

NM indicates not measured.

Table 4 contains several comparative examples. The examples in Table 4 are not compounded formulations that contain rPET. The examples in Table 4 are compositions produced by the polycondensation polymerization processes previously described that contain similar comonomer content as to the compounded blend compositions in Table 3 (CX1-CX4) or commercially produced PET (CX7 and CX8) or commercially produced copolyester (CX6). This study illustrates that the compounded blend compositions of the present disclosure exhibit unexpected melting temperatures and crystallization rates (EX1-EX17) in contrast to the reactor produced, non-compounded formulations of Table 4. The first observation is that CX1-CX4 and CX6 all show melting temperatures well outside the range considered to be compatible with the PET recycle stream (205-222° C.). This is in stark contrast with the compounded blend compositions in Table 3 (melting temperatures 234-244° C.). This difference is also illustrated in FIG. 1. Also, it should be noted that samples CX1-CX4 did not crystallize fast enough in the DSC thermal scan to show a measurable melting temperature. Only after annealing at 150° C. for the stated time (forcing the sample to crystallize prior to the DSC scan) was it possible to even measure a melting temperature. This indicates that these reactor formulations, despite having comonomer contents in the range of many of the samples in Table 3, simply crystallize too slowly and have too low of a melting temperature to be deemed suitable for incorporation into the PET recycle stream. Therefore, the blend compositions of the present disclosure (Table 3) produced by compounding with rPET exhibit unique properties.

TABLE 4

| Reference | Composition | Total wt % Comonomer content (non-EG, DMT/TPA) | IhV (dL/g) Measured | Annealing Condition before scan | $T_m$ (° C.), 1st Heat | $H_m$ (cal/g), 1$^{st}$ Heat | $T_g$ (° C.), 1$^{st}$ Heat |
|---|---|---|---|---|---|---|---|
| CX1 | see Table 2 | 10.1 | 0.67 | 15-30 mins | 205 | 4.5 | 79 |
| CX2 | see Table 2 | 13.0 | 0.68 | 15-30 mins | 206 | 3.6 | 80 |
| CX3 | see Table 2 | 6.5 | 0.64 | 30-60 mins | 211 | 5.2 | 88 |
| CX4 | see Table 2 | 8.6 | 0.65 | 120-240 mins | 202 | 1.1 | 92 |
| CX6 | Sample E12 | 6.5 | 0.58 | As Molded | 222 | 1.9 | 80 |
| CX7 | Sample rPET1 Control | 1.3 | 0.69 | As Molded | 247 | 7.8 | 80 |
| CX8 | Sample E4 | 2.5 | 0.71 | As Molded | 238 | 6.4 | 78 |

Table 3 summaries the haze values on ⅛" (3.175 mm) plaques. At such thickness, most of the haze is due to contamination residing in the rPET material itself, or due to compounding at cold temperatures (poor mixing, as shown with the high haze of sample CX5). Crystallinity, however, can be another source of haze, particularly in thick injection molded articles. In thick articles, if the part cools slowly, it allows time for the polymer in the core of the part to crystallize. To successfully mold clear, thick articles, haze from crystallization must be minimized or eliminated. The compositions of the present disclosure provide a solution to this problem. Table 5 shows the results from molding several of the examples from Table 3 in the wedge plaque test as previously described. All of the samples tested were clear up to at least 7 mm (0.28") thickness or greater. For four samples no crystalline haze was observed even at the thickest end of the plaque. This finding is quite surprising, since materials which are considered recyclable in the PET stream generally crystallize too quickly to mold thick parts. All samples in Table 5 are deemed appropriate for being compatible with the PET stream and are here also shown to mold thick parts without the occurrence of crystallization.

Note that the thickness values reported are an average of the four molding conditions studied, and reported values can be taken as ±1 mm.

TABLE 5

| Reference | Copolyester Content | Copolyester Source | rPET Loading (%) | Total wt % Comonomer content (non-EG, DMT/TPA) | Wedge Plaque (Crystallinity @ X thickness) |
|---|---|---|---|---|---|
| EX3 | 85% | Sample C31 | 15% | 13.7 | None |
| EX7 | 70% | Sample C31 | 30% | 11.5 | None |
| EX8 | 70% | Sample G23 | 30% | 8.9 | None |
| EX9 | 70% | Sample G23 | 30% | 8.9 | None |
| EX13 | 60% | Sample C31 | 40% | 10.0 | 9 mm |
| EX15 | 50% | Sample C31 | 50% | 8.6 | 7 mm |
| EX17 | 50% | Sample G23 | 50% | 6.7 | 9 mm |

In summary, these experiments have identified unique rPET/copolyester blends, made by compounding, which offer molded articles comprising 15-50% rPET, which are low haze (<20%, or even <10%), thick-walled (4-25 mm) and which are compatible with the existing PET recycle streams, as defined by its acceptable crystallization rate and melting temperature in the 225-250° C. range. The data also suggests that compositions produced by compounding rPET with the copolyester compositions having surprising thermal properties (melting temperature, crystallization rate), versus reactor-made products having similar total wt % comonomer content in the 5-15% range.

What is claimed:

1. A method of making a recyclable, extrusion blow-molded article comprising:

(A) compounding a rPET/copolyester blend which comprises:

(1) 20-80 wt % of recycled polyethylene terephthalate (rPET); and (2) 20-80 wt % of at least one copolyester which comprises:

(a) a dicarboxylic acid component comprising:

i) 70 to 100 mole % of terephthalic acid residues, dimethyl terephthalic acid, and/or isophthalic acid; and ii) 0 to 30 mole % of aromatic and/or aliphatic dicarboxylic acid residues having up to 20 carbon atoms; and;

iii) 0 to 5 mole % of a branching monomer; and (b) a glycol component comprising:

i) 15 to 35 mole % of 2,2,4,4-tetramethyl-1,3-cyclobutanediol residues; and v) 65 to 85 mole % of ethylene glycol residues; and vi) 0 to 5 mole % of a branching monomer; and wherein the total mole % of the dicarboxylic acid component is 100 mole %, and the total mole % of the glycol component is 100 mole %; and (3) 0.05 to 5 weight % of a chain extending agent based on the weight of the blend; and wherein the blend has 1-15 wt % total comonomer content from glycols and acids other than ethylene glycol (EG), terephthalic acid (TPA), or dimethyl terephthalate (DMT), and wherein the blend is compounded at a temperature of 260-320° C., and wherein the method further comprises drying the rPET at temperature of up to 150° C. and the copolyester at temperature of up to 65° C. before compounding;

(B) pelletizing the compounded blend;

(C) drying the compounded blend at a temperature of 60-160° C., and optionally crystallizing the compounded blend at 120-180° C. before drying;

(D) melting the compounded blend in an extruder and extruding the molten composition through a die to form a tube or parison of molten polymer; and (E) clamping a mold having the desired finished shape around the parison;

(F) blowing air into the parison, causing it to stretch and expand to fill the mold;

(G) cooling the molded article and ejecting the resulting article from the mold; and (H) removing excess plastic from the article;

wherein the article is transparent and/or has a haze value of less than 20%; wherein the article has a melting temperature (Tm) of 230-250° C.; wherein the article has an enthalpy of melting (Hm) greater than 0.20 cal/g; wherein the inherent viscosity of the copolyester is 0.50 to 1.2 dL/g as determined in 60/40 (wt/wt) phenol/tetrachloroethane at a concentration of 0.5 g/100 ml at 25° C.; wherein the copolyester has a Tg of 70 to 115° C.; wherein the rPET/copolyester blend has a melt viscosity at 1 rad/s and 260° C. of 10,000 to 120,000 poise; and wherein the article has a thickness of less than 4 mm, and wherein the article is recyclable in a PET recycle stream.

2. The method of claim 1, wherein the rPET and copolyester are premixed before feeding the mixture into an extruder for compounding; or wherein the rPET and copolyester are feed into an extruder separately for compounding.

3. The method of claim 1, wherein the blend has 1-15 wt % total comonomer content from glycols and acids other than ethylene glycol (EG), terephthalic acid (TPA), or dimethyl terephthalate (DMT).

4. The method of claim 1, wherein the blend has 7-14 wt % total comonomer content from glycols and acids other than ethylene glycol (EG), terephthalic acid (TPA), or dimethyl terephthalate (DMT) and wherein the article has a thickness of 0.2-4 mm; or wherein the blend has 10-15 wt % total comonomer content from glycols and acids other than ethylene glycol (EG), terephthalic acid (TPA), or dimethyl terephthalate (DMT) and wherein the article has a thickness of 0.2-4 mm.

5. The recyclable, extrusion blow-molded article of claim 1, wherein the chain extending agent is one or more of isocyanates, multifunctional epoxides, including for example epoxylated novolacs, and phenoxy resins.

6. The recyclable, extrusion blow-molded article of claim 1, wherein the branching monomer is one or more of trimellitic acid, trimellitic anhydride, pyromellitic dianhydride, trimethylolpropane, glycerol, pentaerythritol, citric acid, tartaric acid, or 3-hydroxyglutaric acid.

7. The method of claim 1, wherein the article is a container, packaging article, cosmetic jar, bottle, medical container, personal care container, cosmetics container, molded article, medical devices, medical packaging, health-care supplies, commercial foodservice containers, water bottle, or toy.

8. A method of making a recyclable, extrusion blow-molded article comprising:

(A) compounding a rPET/copolyester blend which comprises:

(1) 20-80 wt % of recycled polyethylene terephthalate (rPET); and (2) 20-80 wt % of at least one copolyester which comprises:

(a) a dicarboxylic acid component comprising:

i) 70 to 100 mole % of terephthalic acid residues, dimethyl terephthalic acid, and/or isophthalic acid; and ii) 0 to 30 mole % of aromatic and/or aliphatic dicarboxylic acid residues having up to 20 carbon atoms; and;

iii) 0 to 5 mole % of a branching monomer; and (b) a glycol component comprising:

i) 30 to less than 50 mole % of 1,4-cyclohexanedimethanol residues;

ii) 50 to 70 mole % of ethylene glycol residues;

iii) 0 to 5 mole % of a branching monomer; and wherein the total mole % of the dicarboxylic acid component is 100 mole %, and the total mole % of the glycol component is 100 mole %; and (3) 0.05 to 5 weight % of a chain extending agent based on the weight of the blend; and wherein the blend has 1-15 wt % total comonomer content from glycols and acids other than ethylene glycol (EG), terephthalic acid (TPA), or dimethyl terephthalate (DMT), and wherein the blend is compounded at a temperature of 260-320° C., and wherein the method further comprises drying the rPET at temperature of up to 150° C. and the copolyester at temperature of up to 65° C. before compounding;

(B) pelletizing the compounded blend;

(C) drying the compounded blend at a temperature of 60-160° C., and optionally crystallizing the compounded blend at 120-180° C. before drying;

(D) melting the compounded blend in an extruder and extruding the molten composition through a die to form a tube or parison of molten polymer; and (E) clamping a mold having the desired finished shape around the parison;

(F) blowing air into the parison, causing it to stretch and expand to fill the mold;

(G) cooling the molded article and ejecting the resulting article from the mold; and (H) removing excess plastic from the article;

wherein the article is transparent and/or has a haze value of less than 20%; wherein the article has a melting temperature (Tm) of 230-250° C.; wherein the article has an enthalpy of melting (Hm) greater than 0.20 cal/g; wherein the inherent viscosity of the copolyester is 0.50 to 1.2 dL/g as determined in 60/40 (wt/wt) phenol/tetrachloroethane at a concentration of 0.5 g/100 ml at 25° C.; wherein the copolyester has a Tg of 70 to 115° C.; wherein the rPET/copolyester blend has a melt viscosity at 1 rad/s and 260° C. of 10,000 to 120,000 poise; and wherein the article has a thickness of less than 4 mm, and wherein the article is recyclable in a PET recycle stream.

* * * * *